US012054440B2

(12) United States Patent
Wilson et al.

(10) Patent No.: US 12,054,440 B2
(45) Date of Patent: *Aug. 6, 2024

(54) METHOD FOR APPLICATION OF BIOCHAR IN TURF GRASS AND LANDSCAPING ENVIRONMENTS

(71) Applicant: Carbon Technology Holdings, LLC, Oakdale, MN (US)

(72) Inventors: Richard W. Wilson, San Diego, CA (US); Han Suk Kim, Thousand Oaks, CA (US); Ranko Bontchev, Monrovia, CA (US); Neil Christopher Wahlgren, Ventura, CA (US); Vern S. Traxler, Simi Valley, CA (US); Timothy Alan Thompson, Ventura, CA (US); Brian Buege, Centennial, CO (US); Mark L. Jarand, Oakdale, CA (US)

(73) Assignee: Carbon Technology Holdings, LLC, Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,089

(22) Filed: Jun. 30, 2021

(65) Prior Publication Data
US 2022/0048831 A1 Feb. 17, 2022

Related U.S. Application Data

(60) Continuation of application No. 16/550,506, filed on Aug. 26, 2019, now Pat. No. 11,053,172, which is a
(Continued)

(51) Int. Cl.
*C05D 9/00* (2006.01)
*C05F 11/00* (2006.01)
(Continued)

(52) U.S. Cl.
CPC ............... *C05D 9/00* (2013.01); *C05F 11/00* (2013.01); *C05F 11/02* (2013.01); *C05F 11/08* (2013.01);
(Continued)

(58) Field of Classification Search
None
See application file for complete search history.

(56) References Cited

U.S. PATENT DOCUMENTS 1,369,428 A 2/1921 Hawley
3,841,974 A 10/1974 Osborne
(Continued)

FOREIGN PATENT DOCUMENTS

CN 1997590 7/2007
CN 103053244 4/2013
(Continued)

OTHER PUBLICATIONS

Ahmad et al. Biochar as a Sorbent for Contaminant Management in Soil and Water: A Review, Chemosphere, vol. 99, pp. 19-33 (Nov. 27, 2013).
(Continued)

*Primary Examiner* — Wayne A Langel
(74) *Attorney, Agent, or Firm* — Perkins Coie LLP

(57) ABSTRACT

The present invention relates to a method for applying biochar to turf and landscape to allow the turf and landscape to be effectively maintained under reduced water and/or reduced fertilizer applications.

6 Claims, 27 Drawing Sheets

Root images taken from treatments without rototilling, 19 weeks after sod installation Control | Treated Biochar at 2 CY/acre | Treated Biochar at 6 CY/acre

Related U.S. Application Data continuation-in-part of application No. 16/406,986, filed on May 8, 2019, now Pat. No. 11,111,185, which is a continuation of application No. 15/792,486, filed on Oct. 24, 2017, now Pat. No. 10,301,228, which is a continuation of application No. 15/156,256, filed on May 16, 2016, now Pat. No. 9,809,502, said application No. 16/550,506 is a division of application No. 15/184,763, filed on Jun. 16, 2016, now Pat. No. 10,392,313, which is a continuation-in-part of application No. 14/385,986, filed as application No. PCT/US2012/039862 on May 29, 2012, now Pat. No. 9,493,380, said application No. 15/792,486 is a continuation-in-part of application No. 13/154,213, filed on Jun. 6, 2011, now Pat. No. 8,317,891, said application No. 15/184,763 is a continuation-in-part of application No. 14/036,480, filed on Sep. 25, 2013, now Pat. No. 9,359,268, which is a continuation of application No. 13/189,709, filed on Jul. 25, 2011, now Pat. No. 8,568,493, said application No. 16/550,506 is a continuation-in-part of application No. 16/035,177, filed on Jul. 13, 2018, now Pat. No. 10,556,838, which is a division of application No. 15/213,122, filed on Jul. 18, 2016, now Pat. No. 10,023,503, which is a continuation of application No. 14/873,053, filed on Oct. 1, 2015, now Pat. No. 10,252,951.

(60) Provisional application No. 62/162,219, filed on May 15, 2015, provisional application No. 62/186,876, filed on Jun. 30, 2015, provisional application No. 62/180,525, filed on Jun. 16, 2015, provisional application No. 62/290,026, filed on Feb. 2, 2016, provisional application No. 62/058,445, filed on Oct. 1, 2014, provisional application No. 62/058,472, filed on Oct. 1, 2014.

(51) Int. Cl.
| | |
|---|---|
| *C05F 11/02* | (2006.01) |
| *C05F 11/08* | (2006.01) |
| *C05G 3/00* | (2020.01) |
| *C05G 3/80* | (2020.01) |
| *C09K 17/02* | (2006.01) |
| *C09K 17/04* | (2006.01) |
| *C10B 53/02* | (2006.01) |
| *C10B 57/02* | (2006.01) |
| *C05D 9/02* | (2006.01) |

(52) U.S. Cl.
CPC ............... *C05G 3/00* (2013.01); *C05G 3/80* (2020.02); *C09K 17/02* (2013.01); *C09K 17/04* (2013.01); *C10B 53/02* (2013.01); *C10B 57/02* (2013.01); *C05D 9/02* (2013.01); *Y02E 50/10* (2013.01); *Y02E 50/30* (2013.01); *Y10S 71/903* (2013.01)

(56) References Cited

U.S. PATENT DOCUMENTS

| | | |
|---|---|---|
| 4,153,514 A | 5/1979 | Garrett et al. |
| 4,268,275 A | 5/1981 | Chittick |
| 4,383,391 A | 5/1983 | Thomas et al. |
| 4,421,524 A | 12/1983 | Chittick |
| 4,487,958 A | 12/1984 | Ream et al. |
| 4,495,165 A | 1/1985 | Gurza |
| 4,497,637 A | 2/1985 | Purdy et al. |
| 4,501,644 A | 2/1985 | Thomas |
| 4,530,702 A | 7/1985 | Fetters et al. |
| 4,618,735 A | 10/1986 | Bridle et al. |
| 4,861,351 A | 8/1989 | Nicholas |
| 4,992,480 A | 2/1991 | Mahajan et al. |
| 5,015,423 A | 5/1991 | Eguchi et al. |
| 5,032,618 A | 7/1991 | Marchionna et al. |
| 5,087,786 A | 2/1992 | Nubel et al. |
| 5,204,102 A | 4/1993 | Coles et al. |
| 5,221,290 A | 6/1993 | Dell |
| 5,462,908 A | 10/1995 | Liang et al. |
| 5,504,259 A | 4/1996 | Diebold et al. |
| 5,508,060 A | 4/1996 | Perman et al. |
| 5,756,194 A | 5/1998 | Shogren et al. |
| 5,820,640 A | 10/1998 | Ikura et al. |
| 5,857,807 A | 1/1999 | Longo, Sr. |
| 5,863,467 A | 1/1999 | Mariner et al. |
| 6,133,328 A | 10/2000 | Lightner |
| 6,227,473 B1 | 5/2001 | Arnold |
| 6,228,806 B1 | 5/2001 | Mehta |
| 6,339,031 B1 | 1/2002 | Tan |
| 6,548,026 B1 | 4/2003 | Dales et al. |
| 6,747,067 B2 | 6/2004 | Melnichuk et al. |
| 6,811,703 B2 | 11/2004 | Elliott |
| 6,841,085 B2 | 1/2005 | Werpy et al. |
| 6,923,838 B2 | 8/2005 | Maubert et al. |
| 6,946,496 B2 | 9/2005 | Mankiewicz et al. |
| 6,994,827 B2 | 2/2006 | Safir et al. |
| 7,033,972 B2 | 4/2006 | Shikada et al. |
| 7,226,566 B2 | 6/2007 | Beierle |
| 7,282,189 B2 | 10/2007 | Zauderer |
| 7,458,999 B2 | 12/2008 | Schenck |
| 7,596,906 B2 | 10/2009 | Gold |
| 7,846,979 B2 | 12/2010 | Rojey et al. |
| 7,888,540 B2 | 2/2011 | Deluga et al. |
| 7,947,155 B1 | 5/2011 | Green et al. |
| 8,173,044 B1 | 5/2012 | Cheiky et al. |
| 8,197,573 B2 | 6/2012 | Scharf |
| 8,236,085 B1 | 8/2012 | Cheiky et al. |
| 8,317,891 B1 | 11/2012 | Cheiky et al. |
| 8,317,892 B1 | 11/2012 | Cheiky et al. |
| 8,318,997 B2 | 11/2012 | McAlister |
| 8,361,186 B1 | 1/2013 | Shearer et al. |
| 8,430,937 B2 | 4/2013 | Cheiky et al. |
| 8,431,757 B2 | 4/2013 | Cheiky et al. |
| 8,568,493 B2 | 10/2013 | Cheiky et al. |
| 8,747,797 B2 | 6/2014 | Shearer et al. |
| 8,986,581 B2 | 3/2015 | Eddy et al. |
| 9,260,666 B2 | 2/2016 | Aelion et al. |
| 9,478,324 B1 | 10/2016 | Favetta et al. |
| 9,493,379 B2 | 11/2016 | Cheiky et al. |
| 9,527,780 B2 | 12/2016 | Wilson et al. |
| 9,809,502 B2 | 11/2017 | Bontchev et al. |
| 9,873,639 B1 | 1/2018 | Doccola et al. |
| 9,919,976 B1* | 3/2018 | Joblin, Jr. ............... C05F 3/00 |
| 9,968,911 B2 | 5/2018 | Eddy et al. |
| 9,980,912 B2 | 5/2018 | Belcher et al. |
| 10,023,503 B2 | 7/2018 | Bontchev et al. |
| 10,059,634 B2 | 8/2018 | Jarand et al. |
| 10,065,163 B2 | 9/2018 | Malyala et al. |
| 10,093,588 B2 | 10/2018 | Cheiky et al. |
| 10,118,870 B2 | 11/2018 | Bontchev et al. |
| 10,173,937 B2 | 1/2019 | Belcher et al. |
| 10,233,129 B2 | 3/2019 | Kim et al. |
| 10,252,951 B2 | 4/2019 | Bontchev et al. |
| 10,301,228 B2 | 5/2019 | Bontchev et al. |
| 10,322,389 B2 | 6/2019 | Malyala et al. |
| 10,543,173 B2 | 1/2020 | Belcher et al. |
| 10,640,429 B2 | 5/2020 | Kim |
| 10,870,608 B1 | 12/2020 | Smith et al. |
| 11,053,172 B2* | 7/2021 | Wilson ...................... C05G 3/00 |
| 11,214,528 B2 | 1/2022 | Malyala et al. |
| 11,312,666 B2 | 4/2022 | Belcher et al. |
| 11,384,031 B2 | 7/2022 | Belcher et al. |
| 11,426,350 B1 | 8/2022 | Mackay et al. |
| 2002/0012725 A1 | 1/2002 | Carlson |
| 2003/0119552 A1 | 6/2003 | Laumen et al. |
| 2004/0111968 A1 | 6/2004 | Day et al. |
| 2004/0128909 A1 | 7/2004 | Smiley |
| 2006/0225345 A1 | 10/2006 | Westrate |

(56) References Cited

U.S. PATENT DOCUMENTS

| | | |
|---|---|---|
| 2007/0123420 A1 | 5/2007 | Hayashi et al. |
| 2007/0287068 A1 | 12/2007 | Shimizu et al. |
| 2008/0003166 A1 | 1/2008 | Maletin et al. |
| 2008/0006519 A1 | 1/2008 | Badger |
| 2008/0016769 A1 | 1/2008 | Pearson |
| 2008/0047313 A1 | 2/2008 | Johnson et al. |
| 2008/0093209 A1 | 4/2008 | Noto |
| 2008/0216391 A1 | 9/2008 | Cortright et al. |
| 2008/0223269 A1 | 9/2008 | Paoluccio |
| 2008/0300435 A1 | 12/2008 | Cortright et al. |
| 2008/0317657 A1 | 12/2008 | Hall et al. |
| 2008/0317907 A1 | 12/2008 | Thomas et al. |
| 2009/0007484 A1 | 1/2009 | Smith |
| 2009/0081292 A1 | 3/2009 | Otomo et al. |
| 2009/0126433 A1 | 5/2009 | Piskorz et al. |
| 2009/0139139 A1 | 6/2009 | Tilman et al. |
| 2009/0151251 A1 | 6/2009 | Manzer et al. |
| 2009/0183430 A1 | 7/2009 | Schubert et al. |
| 2009/0196816 A1 | 8/2009 | Yamamoto et al. |
| 2009/0217575 A1 | 9/2009 | Raman et al. |
| 2009/0217584 A1 | 9/2009 | Raman et al. |
| 2009/0253947 A1 | 10/2009 | Brandvold et al. |
| 2009/0308787 A1 | 12/2009 | O'Connor et al. |
| 2010/0040510 A1 | 2/2010 | Randhava et al. |
| 2010/0162780 A1 | 7/2010 | Scharf |
| 2010/0180805 A1 | 7/2010 | Cheiky et al. |
| 2010/0218417 A1 | 9/2010 | Bauldreay et al. |
| 2010/0223839 A1 | 9/2010 | Garcia-Perez et al. |
| 2010/0236309 A1 | 9/2010 | Celia |
| 2010/0236987 A1 | 9/2010 | Kreis |
| 2010/0240900 A1 | 9/2010 | Zhang |
| 2010/0257775 A1 | 10/2010 | Cheiky |
| 2010/0270505 A1 | 10/2010 | Gallaspy et al. |
| 2010/0300866 A1 | 12/2010 | van Aardt et al. |
| 2010/0310447 A1 | 12/2010 | Yaniv et al. |
| 2010/0311157 A1 | 12/2010 | Van Alstyne et al. |
| 2011/0003693 A1 | 1/2011 | Spittle |
| 2011/0023566 A1 | 2/2011 | Lodwig et al. |
| 2011/0081336 A1 | 4/2011 | Medoff |
| 2011/0092726 A1 | 4/2011 | Clarke |
| 2011/0100359 A1 | 5/2011 | North |
| 2011/0172092 A1 | 7/2011 | Lee et al. |
| 2011/0177466 A1 | 7/2011 | Cheiky |
| 2011/0209386 A1 | 9/2011 | Cheiky et al. |
| 2011/0212004 A1 | 9/2011 | Cheiky et al. |
| 2011/0258912 A1 | 10/2011 | O'Connor et al. |
| 2012/0103040 A1 | 5/2012 | Wolf et al. |
| 2012/0125064 A1 | 5/2012 | Joseph et al. |
| 2012/0208254 A1 | 8/2012 | Smith et al. |
| 2012/0220454 A1 | 8/2012 | Chen et al. |
| 2012/0237994 A1 | 9/2012 | Das et al. |
| 2012/0283493 A1 | 11/2012 | Olson et al. |
| 2012/0286209 A1 | 11/2012 | Cheiky et al. |
| 2012/0304718 A1 | 12/2012 | Cheiky et al. |
| 2012/0304719 A1 | 12/2012 | Cheiky et al. |
| 2013/0025188 A1 | 1/2013 | Cheiky et al. |
| 2013/0025190 A1 | 1/2013 | Cheiky et al. |
| 2013/0055635 A1 | 3/2013 | Harman |
| 2013/0123103 A1 | 5/2013 | Anderson et al. |
| 2013/0211158 A1 | 8/2013 | Romanos et al. |
| 2013/0213101 A1 | 8/2013 | Shearer et al. |
| 2014/0016709 A1 | 1/2014 | Ko et al. |
| 2014/0024528 A1 | 1/2014 | Smith et al. |
| 2014/0030250 A1 | 1/2014 | Eddy et al. |
| 2014/0037536 A1 | 2/2014 | Reimerink-Schats et al. |
| 2014/0161709 A1 | 6/2014 | Karthikeyan |
| 2014/0177136 A1 | 6/2014 | Kim et al. |
| 2014/0295161 A1 | 10/2014 | MacLachlan et al. |
| 2014/0345341 A1 | 11/2014 | Fiato et al. |
| 2014/0345343 A1 | 11/2014 | Wilson et al. |
| 2014/0349847 A1 | 11/2014 | Schrader |
| 2014/0352378 A1 | 12/2014 | Shearer et al. |
| 2015/0040624 A1 | 2/2015 | Devine et al. |
| 2015/0101372 A1 | 4/2015 | Cheiky et al. |
| 2015/0128672 A1 | 5/2015 | Shearer et al. |
| 2015/0144564 A1 | 5/2015 | Moller et al. |
| 2015/0155549 A1 | 6/2015 | Moganty et al. |
| 2015/0157661 A1 | 6/2015 | Eddy et al. |
| 2015/0203414 A1 | 7/2015 | Cook |
| 2015/0232349 A1 | 8/2015 | Peltz |
| 2015/0361369 A1 | 12/2015 | Tait et al. |
| 2016/0023959 A1 | 1/2016 | Bontchev et al. |
| 2016/0096746 A1 | 4/2016 | Feng |
| 2016/0100587 A1 | 4/2016 | Bywater-Ekegard et al. |
| 2016/0101990 A1 | 4/2016 | Traxler et al. |
| 2016/0102024 A1 | 4/2016 | Schrader et al. |
| 2016/0229709 A1 | 8/2016 | Beierwaltes et al. |
| 2016/0238317 A1 | 8/2016 | Heimann et al. |
| 2016/0362607 A1 | 12/2016 | Weaver et al. |
| 2016/0368831 A1 | 12/2016 | Bontchev et al. |
| 2017/0008769 A1 | 1/2017 | Otter et al. |
| 2017/0173562 A1 | 6/2017 | Dimiev |
| 2017/0334797 A1 | 11/2017 | Belcher et al. |
| 2019/0256431 A1 | 8/2019 | Zaseybida et al. |

FOREIGN PATENT DOCUMENTS

| | | |
|---|---|---|
| GB | 2479469 | 10/2011 |
| KR | 100819505 | 4/2008 |
| WO | WO 82/04223 | 12/1982 |
| WO | WO 89/09809 | 10/1989 |
| WO | WO 2004/037747 | 5/2004 |
| WO | WO 2005/030641 | 4/2005 |
| WO | WO 2008/058231 | 5/2008 |
| WO | WO 2009/004652 | 1/2009 |
| WO | WO 2010/084230 | 7/2010 |
| WO | WO 2010/129988 | 11/2010 |
| WO | WO 2011/006717 | 1/2011 |
| WO | WO 2011/014916 | 2/2011 |
| WO | WO 2011/097183 | 8/2011 |
| WO | WO 2011/143380 | 11/2011 |
| WO | WO 2011/143718 | 11/2011 |
| WO | WO 2011/159154 | 12/2011 |
| WO | WO 2012/094736 | 7/2012 |
| WO | WO 2014/060508 | 4/2014 |
| WO | WO 2014/091279 | 6/2014 |
| WO | WO 2014/146205 | 9/2014 |
| WO | WO 2015/055729 | 4/2015 |
| WO | WO 2016/054431 | 4/2016 |
| WO | WO 2016/187161 | 11/2016 |

OTHER PUBLICATIONS

Beesley et al., "A review of Biochars? Potential Role in the Remediation,Revegetation and Restoration of Contaminated Soils," Environmental Pollution 159, pp. 3269-3282 (Jul. 23, 2011).

Berek et al., "Improving Soil Productivity with Biochar," ICGAI, Yogyakarta, Indonesia, 23 pgs. (Nov. 11-14, 2013).

Biliaderis et al., "Functional Food Carbohydrates," CRC Press 2006, Ch. 16, pp. 517-518.

Bucheli et al., "Polycyclic Aromatic Hydrocarbons and Polychlorinated AromaticCompounds in Biochar," Biochar for Environmental Management, Ch 21, pp. 595-622 (Jan. 2015).

Buerschaper, R. et al., "Thermal & Electrical Conductivity of Graphite & Carbon at Low Temperatures," Jour. of App. Physics, pp. 452-454 (1944).

Cheng et al., "Stability of Black Carbon in Soils Across a Climatic Gradient," Jour. of Geophysical Research Biogeosciences, vol. 113, G02027, pp. 1-10 (2008).

Chew, T.L. and Bhatia, S., "Catalytic Processes Towards the Production of Biofuelsin a Palm Oail and Oil Palm Biomass-based biorefinery," Bioresource Tech., vol. 99, pp. 7911-8922 (2008).

Demirbas, A., "Effects of Temperature & Particle Size on Bio-Char Yield from Pyrolysis of Agricultural Residues," J. Anal. Pyrolysis, vol. 72, pp. 243-248 (2004).

Downie: Biochar Production and Use: Environmental Risks and Rewards: PhDThesis: The University of New South Wales; Sydney, Australia, p. 1-16, p. 155-168 (2011).

Elliott, D.C. and Neuenschwander, G.G., "Liquid Fuels by Low-SeverityHydrotreating of Biocrude," Dev. In Thermochemical Biomass Conversion, vol. 1, pp. 611-621 (1996).

(56) References Cited

OTHER PUBLICATIONS

EPO; Supplementary European Search Report; May 17, 2018; 8 pages.
Extended European Search Report issued by the European Patent Office for European Patent Application No. 12797129.9 dated Mar. 6, 2015 (7 pgs).
Extended European Search Report issued by the European Patent Office for European Patent Application No. 12817137.8 dated Jul. 13, 2015 (8 pgs).
Faludi, J., "World Changing Change Your Thinking a Carbon-Negative Fuel," Oct. 16, 2007; www.worldchanging.com (9 pgs).
Gehrer R. and Hayek, K., "A Fully Programmable System for the Study of Catalytic Gas Reactions," J. Physc. E: Sci. Instrum., vol. 18, pp. 836-838 (1985).
Gray et al., "Water uptake in Biochars: The Roles of Porosity and Hydrophobicity; Biomass and Bioenergy," Vo. 6, No. 1, pp. 196-205 (Jan. 23, 2014).
Greenfacts, "Facts on Health and the Environment," Dioxins, Apr. 13, 2017, 3 pp.; retrieved from https://www.greenfacts.org/en/d on Aug. 15, 2004.
Hadjittofi et al., "Activated Biochar Derived from Cactus Fibres—Preparation,Characterization and Application on CU(II) Removal from Aqueous Solutions," Bioresource Technology, vol. 159, pp. 460-464 (May 2014).
Hua et al., "Impacts Upon Soil Quality and Plant Growth of Bamboo Charcoal Additionto Composted Sludge," Environmental Technology, vol. 33, No. 1, pp. 61-68 (Jan. 18, 2012).
Innovation Fluides Supercritiques, Explore, Use, Make the Most of Supercritical Fluids, Nov. 27, 2015. Online, retrieved from the Internet on Mar. 6, 2017; <http://web/20151127045828/http://www.supercriticalfluid.org/supercritical-fluids.146.0>html; 2 pp.
Jindo et al., "Biochar Influences the Microbial Community Structure During ManureComposting with Agricultural Wastes," Science of the Total Environment, vol. 416, pp. 476-481 (Feb. 2012).
Karmaker et al., "Plant Defence Activators Inducing Systematic Resistance inZingiber Officinale Rosc. Against Pythium Aphanidermatum (Edson) Fitz.," Indian Journal of Biotechnology, vol. 2, pp. 591-595 (2003).
Kim et al., "Characteristics of Crosslinked Potato Starch & Starch-Filled Linear Low-Density Polyethylene Films," Carbohydrate Polymers, vol. 50, pp. 331-337 (2002).
Kolton et al., "Impact of Biochar Applications to Soil on the Root-AssociatedBacterial Community Structure of Fully Developed Greenhouse Pepper Plants," Appl. Env. Micro., pp. 4924-4930, Abstract (Jul. 2011).
Laird, D., "The Charcoal Vision: A Win Win Scenario," Agron, J., vol. 100, No. 1, pp. 178-181 (2008).
Lashari, et al., "Effect of Amendment of Biochar-manure Compost in Conjunction with Pryroligneous Solution on Soil Quality and Wheat Yield of a salt-stressed Cropland from Central China Great Plain," Field Crops Research, vol. 144, pp. 113-118 (Mar. 20, 2013).
Lehmann, J., "Nutrient Avail. & Leaching in an Archaeological Anthrosol & Ferraisolof the Central Amazon Basin: Fertilizer, Manure and Charcoal Amendments," Plant Soil, vol. 249, pp. 343-357 (2003).

Lima et al., "Physiochemical and Adsorption Properties of Fast-Pyrolysis Bio Charsand their Steam Activated Counterparts," J. Chem. Tech. Biotechnical, vol. 85, pp. 1515-1521 (2010).
Liu et al., "An Experimental Study of Rheological Properties and StabilityCharacteristics of Biochar-Glycerol-Water Slurry Fuels," Fuel Processing Technology, vol. 153, Issue 1, pp. 37-42 (Aug. 5, 2016).
Matthews, J.A., "Carbon-negative Biofuels," Energy Policy, vol. 36, pp. 940-945 (2008).
McHenry, Mark P., "Agricultural Bio-char Production, Renewable Energy Generationand Farm Carbon Sequestration in Western Australia: Certainty, Uncertainty and Risk," Agriculture, Ecosystems and Environments, vol. 129, pp. 1-7 (2009).
Mohan et al., "Pyrolysis of Wood/Biomass for Bio-Oil: A Critical Review," Energy & Fuels, vol. 20, pp. 848-889 (2006).
Norman et al., "Best Management Practices for Reclaiming Surface Mines inWashington and Oregon," Open-File Report 0-92-2, revised Dec. 1997; www.oregongeology.org Feb. 9, 2010 (128 pgs).
Ogawa et al., "Carbon Sequestration by Carbonization of Biomass and Forestation:Three Case Studies," Mitigation and Adaptation Strategies for Global Change (2006) 11:429-444; 16 pp.
Oh et al., "Utilization of Biochar Impregnated with Anaerobically Digested Slurry asSlow-Release Fertilizer," Journal of Plant Nutrition and Soil Science, vol. 177, Issue 1, pp. 97-103 (Feb. 2014).
Omata et al., "Optimization of Cu Oxide Catalyst for Methanol Synthesis under High C02 Partial Pressure Using Combinatorial Tools," App. Catalyst A: General, vol. 262, pp. 207-214 (2004).
Preston, C.M. et al., "Black (Pyrogenic) Carbon; a Synthesis of Current Knowledge& Uncertainties with Special Consideration of Boreal Regions," Biogeosciences, vol. 3 pp. 397-420 (2006).
Rosenberg et al., "More on Commercial Carbon Resistors as Low Pressure Gauges," Intl. Jour of Impat. Engl, vol. 34, pp. 732-742 (2007).
Schmidt et al., "Biochar and Biochar-compost as Soil Amendments to a Vineyard Soil: Influence on Plant Growth Nutrient Update, Plant Health and Grape Equality," Agricuture, Ecosystems and Environment, vol. 191, Issue 15, pp. 117-123 (Jun. 2014).
Sharma, R.K. and Bakhshi, N.N., "Catalytic Upgrading of Pyrolysis Oil," Energy & Fuels, vol. 7, pp. 306-314 (1993).
Shivaram et al., "Flow and Yield Behavior of Ultrafine Mallee Biochar Slurry Fuels:The Effect of Particle Size Distribution and Additives," 10th Japan/China Symposium on Coal and C1 Chemistry, vol. 104, pp. 326-332 (Feb. 2013).
Sorrenti, G. (Doctoral Thesis): "Biochar in Perennial Crops: Nutritional,Agronomical and Environmental Implications," University of Bologna, Abstract, Chs. 4, 5, 7, p. 101 Table 4.2 (Mar. 1, 2015).
Takeishi, K., "Dimethy Ether & Catalyst Development for Production of Syngas," Biofuels, vol. 1(1), pp. 217-226 (2010).
Tryon, E.H., "Effect of Charcoal on Certain Physical, Chemical, & BiologicalProperties of Forest Soils," Ecological Monographs, vol. 18, No. 1, pp. 81-115 (Jan. 1948).
Wikipedia; Bacillus Thuringiensis; Dec. 27, 2015; online, retrieved from the Internet on Mar. 6, 2017; <https://en/wikipedia.org/w/index.php?title=bacillus+thuringiensis&oldid=69697011>; 6 pp.
Xusheng, et al., "Implications of Production and Agricultural Utilization of Biocharand its International Dynamic," Transaction of the CSAE, vol. 27, No. 2, 7 pgs. (2011) with English Abstract.

* cited by examiner

METHOD FOR APPLICATION OF BIOCHAR IN TURF GRASS AND LANDSCAPING ENVIRONMENTS

RELATED APPLICATIONS

This application is a continuation of U.S. patent application Ser. No. 16/550,506, filed Aug. 26, 2019, which is a divisional of U.S. patent application Ser. No. 15/184,763, filed Jun. 16, 2016 (now U.S. Pat. No. 10,392,313), which application claims priority to U.S. Provisional Patent Application No. 62/186,876 filed Jun. 30, 2015 t and to U.S. Provisional Patent Application No. 62/180,525 filed Jun. 16, 2015 and U.S. Provisional Patent Application No. 62/290,026 filed Feb. 2, 2016; U.S. patent application Ser. No. 15/184,763 is also is a continuation-in-part of U.S. patent application Ser. No. 14/385,986 filed on Dec. 23, 2014 (now U.S. Pat. No. 9,493,380), which is a 371 of PCT/US12/39862 filed on May 29, 2012, which application is a continuation-in-part of U.S. patent application Ser. No. 13/154,213 filed on Jun. 6, 2011 (now U.S. Pat. No. 8,317,891); U.S. patent application Ser. No. 15/184,763 is also a continuation-in-part of U.S. patent application Ser. No. 14/036,480, filed on Sep. 25, 2013 (now U.S. Pat. No. 9,359,268), which is a continuation of U.S. patent application Ser. No. 13/189,709, filed on Jul. 25, 2011 (now U.S. Pat. No. 8,568,493); U.S. patent application Ser. No. 16/550,506 is also a continuation-in-part of U.S. patent application Ser. No. 16/406,986, filed on May 8, 2019, which is a continuation of U.S. patent application Ser. No. 15/792,486, filed on Oct. 24, 2017, (now U.S. Pat. No. 10,301,228), which is a continuation of U.S. patent application Ser. No. 15/156,256, filed on May 16, 2016, (now U.S. Pat. No. 9,809,502), which claims priority to U.S. Provisional Patent Application No. 62/162,219, filed on May 15, 2015; U.S. patent application Ser. No. 15/792,486 is also a continuation-in-part of U.S. patent application Ser. No. 13/154,213 filed on Jun. 6, 2011 (now U.S. Pat. No. 8,317,891; U.S. patent application Ser. No. 16/550,506 is also a continuation-in-part of U.S. patent application Ser. No. 16/035,177 filed on Jul. 13, 2018 (now U.S. Pat. No. 10,023,503), which is a divisional of U.S. patent application Ser. No. 15/213,122 filed on Jul. 18, 2016, (now U.S. Pat. No. 10,023,503), which is a continuation of U.S. patent application Ser. No. 14/873,053 filed on Oct. 1, 2015, (now U.S. Pat. No. 10,252,951), which claims priority to U.S. Provisional Patent Application No. 62/058,445, filed on Oct. 1, 2014, and U.S. Provisional Patent Application No. 62/058,472, filed on Oct. 1, 2014, all of the above of which are incorporated in their entirety by reference in this application.

BACKGROUND OF THE INVENTION

1. Field of Invention

The invention relates to a method for application of biochar and enhanced biochar in turf grass environments, and in particular, an organic soil amendment produced from plant matter that significantly improves water holding capacity, plant quality and landscape resilience.

2. Background

Turfs and lawns can provide many benefits including providing spaces for recreational activities, including golf courses, sporting fields, and parks, decreasing runoff from storm events, beautifying urban areas, and providing cooling, but generally these grasses require significant water to stay healthy, attractive, and functional. The "California Single Family Water Use Efficiency Study" published in June, 2011 (see www.irwd.com/images/pdf/save-water/CaSingleFamilyWaterUseEfficiencyStudyJune2011.pdf) found 53 percent of a single-family household's water usage was for outdoor use, or about 190 gallons per household per day. Unfortunately, water is a limited natural resource and it is becoming increasingly expensive and in certain areas, such as California, in short supply. Thus water conservation is a challenge facing many people and governments, especially in areas facing water shortages. For example a five-year drought in California that continues today, has pushed the state government to put executive orders and laws in place to help curb the water usage in the state. In January 2014, the governor of California declared a state of emergency, recommending a 20 percent reduction in water use be implemented statewide. Then in July of 2014, the governor signed into legislation new laws requiring urban water suppliers and public water distributors to adopt emergency water conservation practices. In April of 2015, as the drought continued, the governor further ordered the State Water Resources Control Board to achieve a 25 percent reduction in urban water usage and instructed the California Department of Water Resources to work towards replacing 50 million square feet of lawns and turf with drought tolerant landscapes. Similarly, in the State of Florida, many municipalities have resorted to fertilizer bans or restrictions during the summer months to reduce the amount of nitrates, phosphates, and other nutrients leached into the groundwater and runoff into the storm water collection facilities and surrounding ocean and/or natural waterways. Much of this runoff is generated through fertilization performed on turf grass and ornamental landscapes. A need exists, not just in California and Florida, but in other areas of the world, for solutions to allow both public and private entities to maintain turfs, lawns, and grasses while conserving water and allowing for more efficient use of synthetic chemicals and nutrients.

SUMMARY

The present invention relates to a method for applying biochar to turf and landscape to allow the turf and landscape to be effectively maintained under reduced water and/or reduced fertilizer applications. California Economic Policy Report: Lawn and Water Demands in CA, reported that fifty percent or more of California's household water use goes to lawns and outdoor landscaping. By applying biochar to turf and landscape, as further described below, municipalities and residents alike can reduce water consumption and respond to statewide goals for water conservation.

For the purposes of this application, "turf" shall have the broadest possible interpretation and apply to grasses or other grass-like plants, ornamental or otherwise, which typically are used to cover large areas of ground in order to improve aesthetics, make an area more suitable for recreation, reduce soil erosion, or other applications. Some typical types of turf grass are Bermuda, Fescue, St. Augustine, Ryegrass, Bluegrass, as well as mixtures of these and others.

The method of the present invention includes applying porous carbonaceous particles (e.g., biochar), where at least 75% of the particles have a particle size less than or equal to 10 mm, to an area of soil or turf grass to improve the survivability of new installation, improve the health and appearance of grass, or maintain the turf grass, especially during periods of drought. One example of an application includes spreading a layer of porous carbonaceous particles over the area of soil in amount ranging from 1 to 15 cubic yards per acre, prior to installing sod. Another example of an application includes creating voids in the area of soil, spreading the porous carbonaceous particles over the area of soil in an amount ranging from 1-15 cubic yards per acre and raking the porous carbonaceous particles into the soil after spreading. Alternatively, the application can comprise spreading the porous carbonaceous particles on the surface of the soil or incorporating the porous carbonaceous particles into the top 1-2 inches of the area of soil prior to planting. The porous carbonaceous particles applied may be treated porous carbonaceous particles (some forms of which are known as enhanced biochar), which are treated by infusing a liquid into the pores of the plurality of porous carbonaceous particles.

As demonstrated below, the biochar applied to the turf and landscape of the present invention increases the retention of water and nutrients in the soil which is an enabler for superior soils rich with organic matter and microbial life. The application results in visibly fuller turf and landscapes with improved vitality and longevity that can be maintained with less water.

Other devices, apparatus, systems, methods, features and advantages of the invention are or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention.

DETAILED DESCRIPTION

Figure 1:
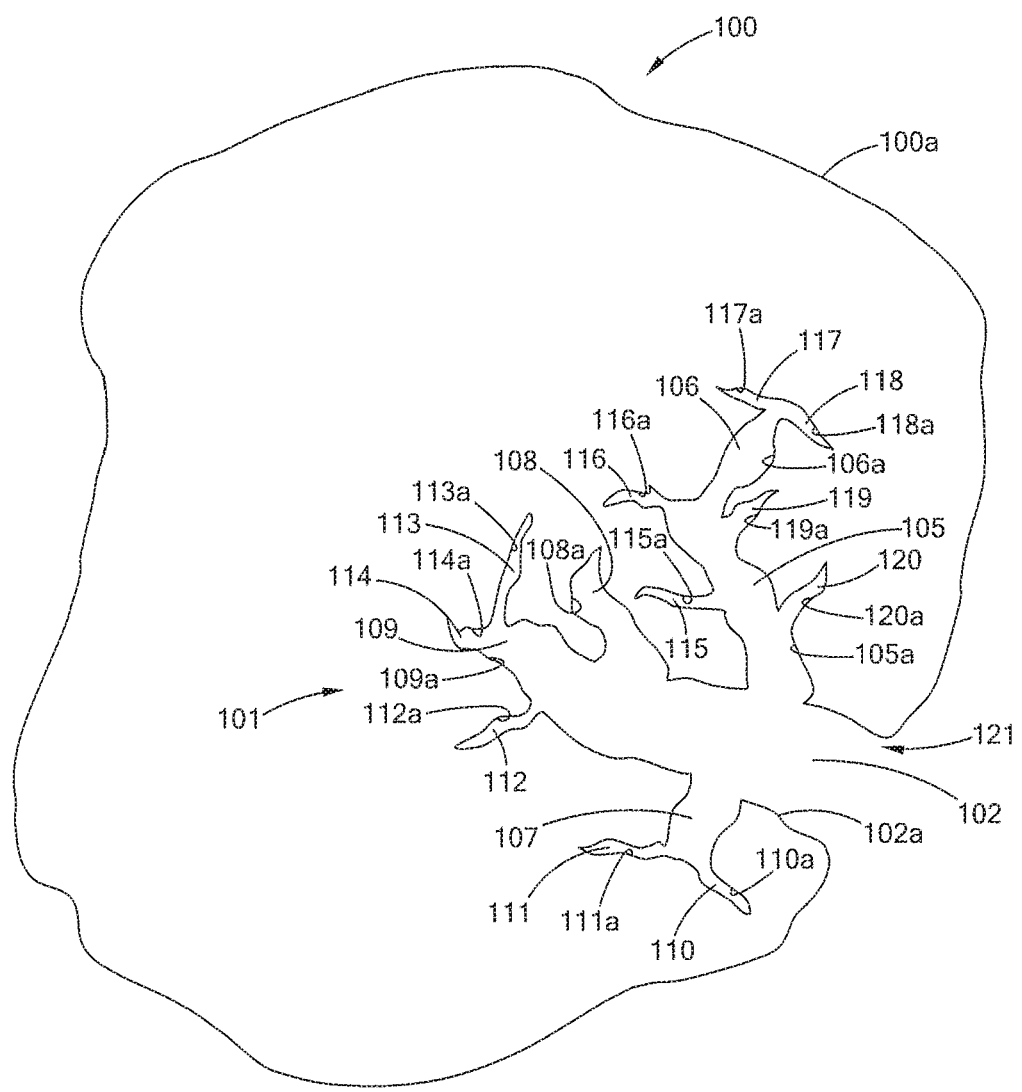
FIG. 1 illustrates a cross-section of one example of a raw biochar particle.

As illustrated in the attached figures, the present invention relates to a method for applying biochar to landscaping and turf that reduces water consumption by increasing overall water holding capacity of the soil. As described below, raw biochar may be treated to increase the water holding and retention capacities of the overall soil. Through treatment, the properties of the raw biochar can be modified to significantly increase the biochar's ability to retain water and/or nutrients while also, in many cases, creating an environment beneficial to microorganisms. The processing of the biochar can also ensure that the pH of biochar used in the present application is suitable for creating soil conditions beneficial for turf growth, which has been a challenge for raw biochars.

For purposes of this application, the term "biochar" shall be given its broadest possible meaning and shall include any solid materials obtained from the pyrolysis, torrefaction, gasification or any other thermal and/or chemical conversion of a biomass, where the biochar contains at least 55% carbon based upon weight. Pyrolysis is generally defined as a thermochemical decomposition of organic material at elevated temperatures in the absence of, or with reduced levels of oxygen.

For purposes of this application, biochar may include, but not be limited to, BMF char disclosed and taught by U.S. Pat. No. 8,317,891, which is incorporated into this application by reference, and those materials falling within the IBI and AAPFCO definition of biochar. When the biochar is referred to as "treated" or undergoes "treatment," it shall mean raw, pyrolyzed biochar that has undergone additional physical, biological, and/or chemical processing.

As used herein, unless specified otherwise, the terms "carbonaceous", "carbon based", "carbon containing", and similar such terms are to be given their broadest possible meaning, and would include materials containing carbon in various states, crystallinities, forms and compounds.

As used herein, unless stated otherwise, room temperature is 25° C. And, standard temperature and pressure is 25° C. and 1 atmosphere. Unless stated otherwise, generally, the term "about" is meant to encompass a variance or range of 10%, the experimental or instrument error associated with obtaining the stated value, and preferably the larger of these.

A. Biochars

Typically, biochars include porous carbonaceous materials, such as charcoal, that are used as soil amendments or other suitable applications. Biochar most commonly is created by pyrolysis of a biomass. In addition to the benefits to plant growth, yield and quality, etc.; biochar provides the benefit of reducing carbon dioxide ($CO_2$) in the atmosphere by serving as a method of carbon sequestration. Thus, biochar has the potential to help mitigate climate change, via carbon sequestration. However, to accomplish this important, yet ancillary benefit, to any meaningful extent, the use of biochar in agricultural applications must become widely accepted, e.g., ubiquitous. Unfortunately, because of the prior failings in the biochar arts, this has not occurred. It is believed that with the solutions of the present invention may this level of use of biochar be achieved; and more importantly, yet heretofore unobtainable, realize the benefit of significant carbon sequestration.

In general, one advantage of putting biochar in soil includes long term carbon sequestration. It is theorized that as worldwide carbon dioxide emissions continue to mount, benefits may be obtained by, controlling, mitigating and reducing the amount of carbon dioxide in the atmosphere and the oceans. It is further theorized that increased carbon dioxide emissions are associated with the increasing industrial development of developing nations, and are also associated with the increase in the world's population. In addition to requiring more energy, the increasing world population will require more food. Thus, rising carbon dioxide emissions can be viewed as linked to the increasing use of natural resources by an ever increasing global population. As some suggest, this larger population brings with it further demands on food production requirements. Biochar uniquely addresses both of these issues by providing an effective carbon sink, e.g., carbon sequestration agent, as well as, an agent for improving and increasing agricultural output. In particular, biochar is unique in its ability to increase agricultural production, without increasing carbon dioxide emission, and preferably reducing the amount of carbon dioxide in the atmosphere. However, as discussed above, this unique ability of biochar has not been realized, or seen, because of the inherent problems and failings of prior biochars including, for example, high pH, phytotoxicity due to high metals content and/or residual organics, and dramatic product inconsistencies.

Biochar can be made from basically any source of carbon, for example, from hydrocarbons (e.g., petroleum based materials, coal, lignite, peat) and from a biomass (e.g., woods, hardwoods, softwoods, waste paper, coconut shell, manure, chaff, food waste, etc.). Combinations and variations of these starting materials, and various and different members of each group of starting materials can be, and are, used. Thus, the large number of vastly different starting materials leads to biochars having different properties.

Many different pyrolysis or carbonization processes can be, and are used to create biochars. In general, these processes involve heating the starting material under positive pressure, reduced pressure, vacuum, inert atmosphere, or flowing inert atmosphere, through one or more heating cycles where the temperature of the material is generally brought above about 400° C., and can range from about 300° C. to about 900° C. The percentage of residual carbon formed and several other initial properties are strong functions of the temperature and time history of the heating cycles. In general, the faster the heating rate and the higher the final temperature the lower the char yield. Conversely, in general, the slower the heating rate or the lower the final temperature the greater the char yield. The higher final temperatures also lead to modifying the char properties by changing the inorganic mineral matter compositions, which in turn, modify the char properties. Ramp, or heating rates, hold times, cooling profiles, pressures, flow rates, and type of atmosphere can all be controlled, and typically are different from one biochar supplier to the next. These differences potentially lead to a biochar having different properties, further framing the substantial nature of one of the problems that the present inventions address and solve. Generally, in carbonization most of the non-carbon elements, hydrogen and oxygen are first removed in gaseous form by the pyrolytic decomposition of the starting materials, e.g., the biomass. The free carbon atoms group or arrange into crystallographic formations known as elementary graphite crystallites. Typically, at this point the mutual arrangement of the crystallite is irregular, so that free interstices exist between them. Thus, pyrolysis involves thermal decomposition of carbonaceous material, e.g., the biomass, eliminating non-carbon species, and producing a fixed carbon structure.

As noted above, raw or untreated biochar is generally produced by subjecting biomass to either a uniform or varying pyrolysis temperature (e.g., 300° C. to 550° C. to 750° C. or more) for a prescribed period of time in a reduced oxygen environment. This process may either occur quickly, with high reactor temperature and short residence times, slowly with lower reactor temperatures and longer residence times, or anywhere in between. To achieve better results, the biomass from which the char is obtained may be first stripped of debris, such as bark, leaves and small branches, although this is not necessary. The biomass may further include feedstock to help adjust the pH, cationic and anionic exchange capacity, hydrophilicity, and particle size distribution in the resulting raw biochar. In some applications, it is desirous to have biomass that is fresh, less than six months old, and with an ash content of less than 3%. Further, by using biochar derived from different biomass, e.g., pine, oak, hickory, birch and coconut shells from different regions, and understanding the starting properties of the raw biochar, the treatment methods can be tailored to ultimately yield a treated biochar with predetermined, predictable physical and chemical properties. Additionally, the biomass may be treated with various organic or inorganic substances prior to pyrolysis to impact the reactivity of the material during pyrolysis and/or to potentially be fixed in place and available for reaction with various substances during the treatment process after pyrolysis. Trace materials, usually in gaseous form, but potentially in other forms, may also be injected during the pyrolysis process with the intention of either modifying the characteristics of the raw biochar produced, or for potential situation on the raw biochar so that those materials, or a descendant material created by thermal or chemical reaction during pyrolysis, may be reacted with other compounds during the treatment process.

In general, biochar particles can have a very wide variety of particle sizes and distributions, usually reflecting the sizes occurring in the input biomass. Additionally, biochar can be ground, sieved, strained, or crushed after pyrolysis to further modify the particle sizes. Typically, for agricultural uses, biochars with consistent, predictable particle sizes are more desirable. By way of example, the biochar particles can have particle sizes as shown or measured in Table 1 below. When referring to a batch having 14 inch particles, the batch would have particles that will pass through a 3 mesh sieve, but will not pass through (i.e., are caught by or sit atop) a 4 mesh sieve.

TABLE 1

| U.S. Mesh (i.e., mesh) | Inches | Microns (μm) | Millimeters (mm) |
| --- | --- | --- | --- |
| 3 | 0.2650 | 6730 | 6.370 |
| 4 | 0.1870 | 4760 | 4.760 |
| 5 | 0.1570 | 4000 | 4.000 |
| 6 | 0.1320 | 3360 | 3.360 |
| 7 | 0.1110 | 2830 | 2.830 |
| 8 | 0.0937 | 2380 | 2.380 |
| 10 | 0.0787 | 2000 | 2.000 |
| 12 | 0.0661 | 1680 | 1.680 |
| 14 | 0.0555 | 1410 | 1.410 |
| 16 | 0.0469 | 1190 | 1.190 |
| 18 | 0.0394 | 1000 | 1.000 |
| 20 | 0.0331 | 841 | 0.841 |
| 25 | 0.0280 | 707 | 0.707 |
| 30 | 0.0232 | 595 | 0.595 |
| 35 | 0.0197 | 500 | 0.500 |
| 40 | 0.0165 | 400 | 0.400 |
| 45 | 0.0138 | 354 | 0.354 |
| 50 | 0.0117 | 297 | 0.297 |
| 60 | 0.0098 | 250 | 0.250 |
| 70 | 0.0083 | 210 | 0.210 |
| 80 | 0.0070 | 177 | 0.177 |
| 100 | 0.0059 | 149 | 0.149 |
| 120 | 0.0049 | 125 | 0.125 |
| 140 | 0.0041 | 105 | 0.105 |
| 170 | 0.0035 | 88 | 0.088 |
| 200 | 0.0029 | 74 | 0.074 |
| 230 | 0.0024 | 63 | 0.063 |
| 270 | 0.0021 | 53 | 0.053 |
| 325 | 0.0017 | 44 | 0.044 |
| 400 | 0.0015 | 37 | 0.037 |

For most basic agricultural applications, it is desirable to use biochar particles having particle sizes from about ¾ mesh to about $^{60}/_{70}$ mesh, about ⅘ mesh to about $^{20}/_{25}$ mesh, or about ⅘ mesh to about $^{30}/_{35}$ mesh. However, for applications such as seed treatment, or microbial carriers, smaller mesh sizes ranging from 200, to 270, to 325, to 400 mesh or beyond may be desirable. It is understood that the desired mesh size, and mesh size distribution can vary depending upon a particular application for which the biochar is intended.

FIG. 1 illustrates a cross-section of one example of a raw biochar particle. As illustrated in FIG. 1, a biochar particle 100 is a porous structure that has an outer surface 100a and a pore structure 101 formed within the biochar particle 100. As used herein, unless specified otherwise, the terms "porosity", "porous", "porous structure", and "porous morphology" and similar such terms are to be given their broadest possible meaning, and would include materials having open pores, closed pores, and combinations of open and closed pores, and would also include macropores, mesopores, and micropores and combinations, variations and continuums of these morphologies. Unless specified otherwise, the term "pore volume" is the total volume occupied by the pores in a particle or collection of particles; the term "inter-particle void volume" is the volume that exists between a collection of particle; the term "solid volume or volume of solid means" is the volume occupied by the solid material and does not include any free volume that may be associated with the pore or inter-particle void volumes; and the term "bulk volume" is the apparent volume of the material including the particle volume, the inter-particle void volume, and the internal pore volume.

The pore structure 101 forms an opening 121 in the outer surface 100a of the biochar particle 100. The pore structure 101 has a macropore 102, which has a macropore surface 102a, and which surface 102a has an area, i.e., the macropore surface area. (In this diagram only a single micropore is shown. If multiple micropores are present than the sum of their surface areas would equal the total macropore surface area for the biochar particle.) From the macropore 102, several mesopores 105, 106, 107, 108 and 109 are present, each having its respective surfaces 105a, 106a, 107a, 108a and 109a. Thus, each mesopore has its respective surface area; and the sum of all mesopore surface areas would be the total mesopore surface area for the particle. From the mesopores, e.g., 107, there are several micropores 110, 111, 112, 113, 114, 115, 116, 117, 118, 119 and 120, each having its respective surfaces 110a, 111a, 112a, 113a, 114a, 115a, 116a, 117a, 118a, 119a and 120a. Thus, each micropore has its respective surface area and the sum of all micropore surface areas would be the total micropore surface area for the particle. The sum of the macropore surface area, the mesopore surface area and the micropore surface area would be the total pore surface area for the particle.

Macropores are typically defined as pores having a diameter greater than 300 nm, mesopores are typically defined as diameter from about 1-300 nm, and micropores are typically defined as diameter of less than about 1 nm, and combinations, variations and continuums of these morphologies. The macropores each have a macropore volume, and the sum of these volumes would be the total macropore volume. The mesopores each have a mesopore volume, and the sum of these volumes would be the total mesopore volume. The micropores each have a micropore volume, and the sum of these volumes would be the total micropore volume. The sum of the macropore volume, the mesopore volume and the micropore volume would be the total pore volume for the particle.

Additionally, the total pore surface area, volume, mesopore volume, etc., for a batch of biochar would be the actual, estimated, and preferably calculated sum of all of the individual properties for each biochar particle in the batch.

It should be understood that the pore morphology in a biochar particle may have several of the pore structures shown, it may have mesopores opening to the particle surface, it may have micropores opening to particle surface, it may have micropores opening to macropore surfaces, or other combinations or variations of interrelationship and structure between the pores. It should further be understood that the pore morphology may be a continuum, where moving inwardly along the pore from the surface of the particle, the pore transitions, e.g., its diameter becomes smaller, from a macropore, to a mesopore, to a micropore, e.g., macropore 102 to mesopore 109 to micropore 114.

In general, most biochars have porosities that can range from 0.2 $cm_3/cm_3$ to about 0.8 $cm_3/cm_3$ and more preferably about 0.2 $cm_3/cm_3$ to about 0.5 $cm_3/cm_3$. (Unless stated otherwise, porosity is provided as the ratio of the total pore volumes (the sum of the micro+meso+macro pore volumes) to the solid volume of the biochar. Porosity of the biochar particles can be determined, or measured, by measuring the micro-, meso-, and macro pore volumes, the bulk volume, and the inter particle volumes to determine the solid volume by difference. The porosity is then calculated from the total pore volume and the solid volume.

Figure 2C:
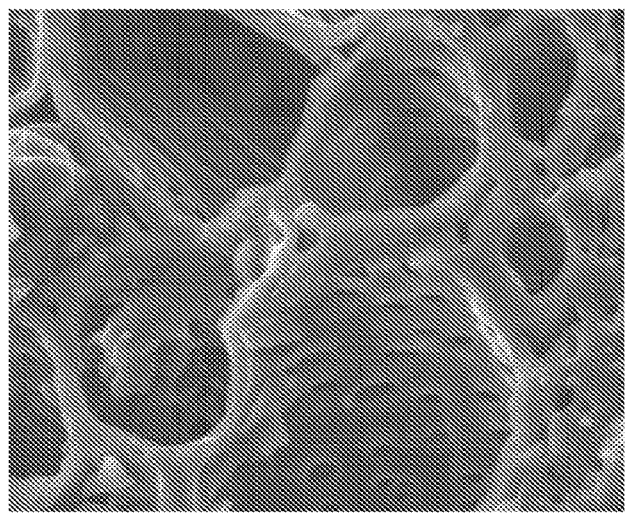
FIG. 2c is a SEM (10 KV×3.00K 10.0 μm) of pore morphology of treated biochar made from coconut shells.
Figure 2B:
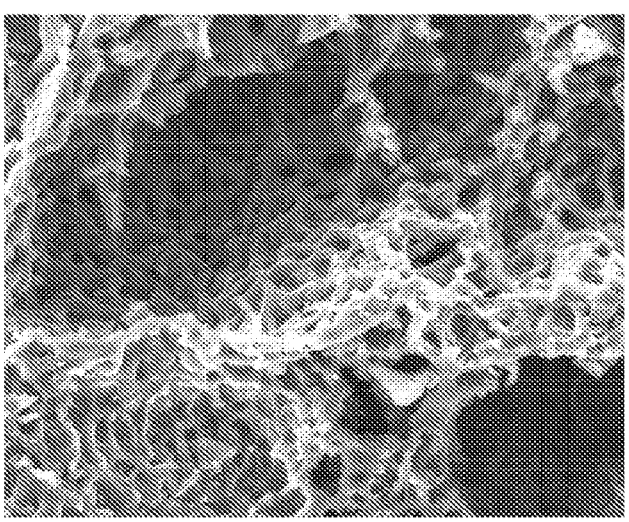
FIG. 2b is a SEM (10 KV×3.00K 10.0 μm) of pore morphology of treated biochar made from birch.
Figure 2A:
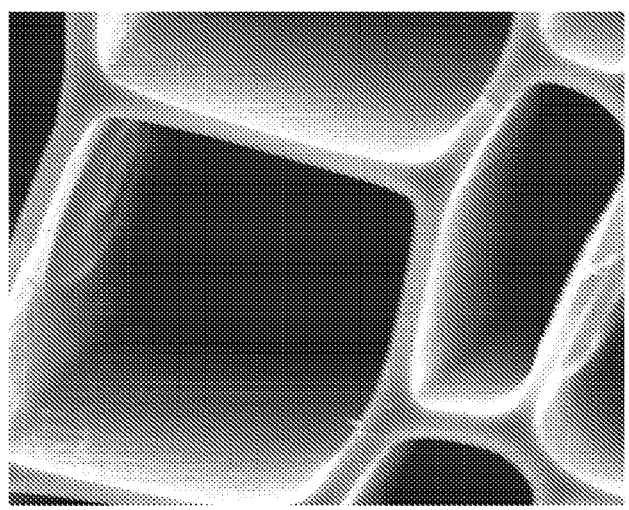
FIG. 2a is a SEM (10 KV×3.00K 10.0 μm) of pore morphology of treated biochar made from pine.

As noted above, the use of different biomass potentially leads to biochars having different properties, including, but not limited to different pore structures. By way of example, FIGS. 2A, 2B and 2C illustrate Scanning Electron Microscope ("SEM") images of various types of treated biochars showing the different nature of their pore morphology. FIG. 2A is biochar derived from pine. FIG. 2B is biochar derived from birch. FIG. 2C is biochar derived from coconut shells.

The surface area and pore volume for each type of pore, e.g., macro-, meso- and micro- can be determined by direct measurement using $CO_2$ adsorption for micro-, $N_2$ adsorption for meso- and macro pores and standard analytical surface area analyzers and methods, for example, particle analyzers such as Micrometrics instruments for meso- and micro pores and impregnation capacity for macro pore volume. Mercury porosimetry, which measures the macroporosity by applying pressure to a sample immersed in mercury at a pressure calibrated for the minimum pore diameter to be measured, may also be used to measure pore volume.

Figure 3:
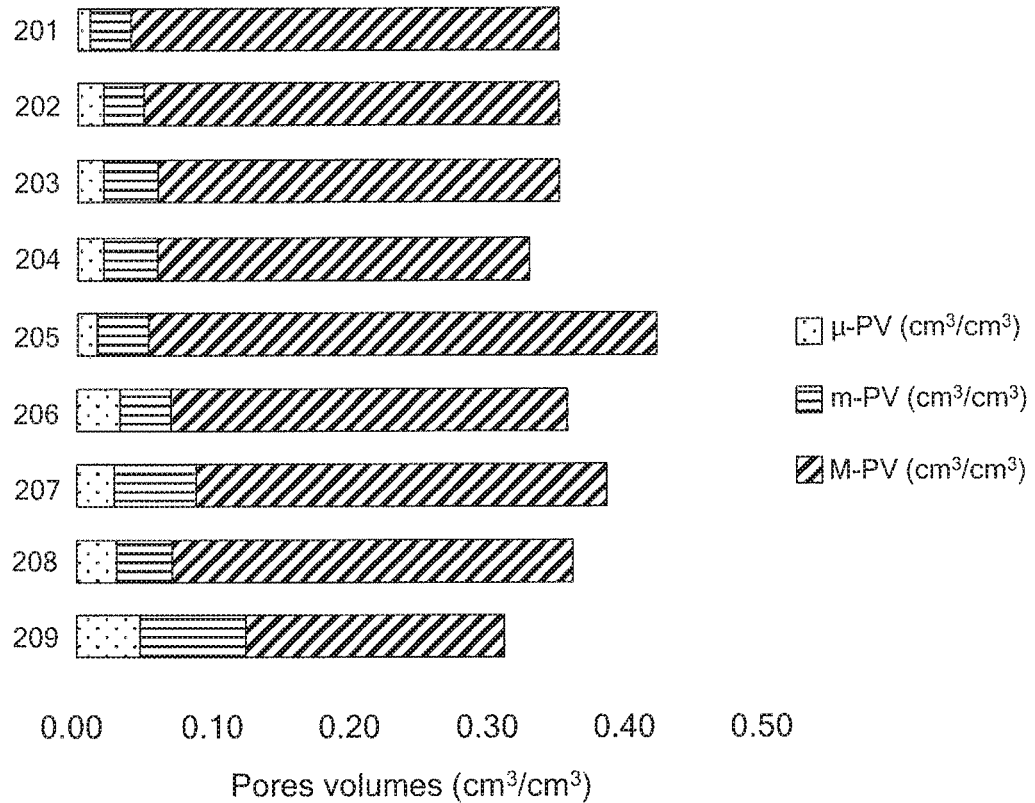
FIG. 3 is a chart showing porosity distribution of various biochars.

The total micropore volume can be from about 2% to about 25% of the total pore volume. The total mesopore volume can be from about 4% to about 35% of the total pore volume. The total macropore volume can be from about 40% to about 95% of the total pore volume. By way of example, FIG. 3 shows a bar chart setting out examples of the pore volumes for sample biochars made from peach pits 201, juniper wood 202, a first hard wood 203, a second hard wood 204, fir and pine waste wood 205, a first pine 206, a second pine 207, birch 208 and coconut shells 209.

As explained further below, treatment can increase usable pore volumes and, among other things, remove obstructions in the pores, which leads to increased retention properties and promotes further performance characteristics of the biochar. Knowing the properties of the starting raw biochar, one can treat the biochar to produce controlled, predictable and optimal resulting physical and chemical properties.

B. Treatment

The rationale for treating the biochar after pyrolysis is that given the large internal pore volume and large interior surface area of the biochars, it is most efficient to make significant changes in the physical and chemical properties of the biochar by treating both the internal and external surfaces and internal pore volume of the char. Testing has demonstrated that if the biochar is treated, at least partially, in a manner that causes the forced infusion and/or diffusion of liquids and/or vapors into and/or out of the biochar pores (through mechanical, physical, or chemical means), certain properties of the biochar can be altered or improved over and above simply contacting these liquids with the biochar. By knowing the properties of the raw biochar and the optimal desired properties of the treated biochar, the raw biochar can then be treated in a manner that results in the treated biochar having controlled optimized properties.

For purposes of this application, treating and/or washing the biochar in accordance with the present invention involves more than simply contacting, washing or soaking, which generally only impacts the exterior surfaces and a small percentage of the interior surface area. "Washing" or "treating" in accordance with the present invention, and as used below, involves treatment of the biochar in a manner that causes the forced, accelerated or assisted infusion and/or diffusion of liquids, vapors, and/or additivities into and/or out of the biochar pores (through mechanical, physical, biological, or chemical means) such that certain properties of the biochar can be altered or improved over and above simply contacting these liquids with the biochar or so that treatment becomes more efficient or rapid from a time standpoint over simple contact or immersion.

In particular, effective treatment processes can mitigate deleterious pore surface properties, remove undesirable substances from pore surfaces or volume, and impact anywhere from between 10% to 99% or more of pore surface area of a biochar particle. By modifying the usable pore surfaces through treatment and removing deleterious substances from the pore volume, the treated biochars can exhibit a greater capacity to retain water and/or other nutrients as well as being more suitable habitats for some forms of microbial life. Through the use of treated biochars, agricultural applications can realize increased moisture control, increased nutrient retention, reduced water usage, reduced water requirements, reduced runoff or leaching, increased nutrient efficiency, reduced nutrient usage, increased yields, increased yields with lower water requirements and/or nutrient requirements, increases in beneficial microbial life, improved performance and/or shelf life for inoculated bacteria, increased efficacy as a substrate for microbial growth or fermentation, and any combination and variation of these and other benefits.

Treatment further allows the biochar to be modified to possess certain known properties that enhance the benefits received from the use of biochar. While the selection of feedstock, raw biochar and/or pyrolysis conditions under which the biochar was manufactured can make treatment processes less cumbersome, more efficient and further controlled, treatment processes can be utilized that provide for the biochar to have desired and generally sustainable resulting properties regardless of the biochar source or pyrolysis conditions. As explained further below, treatment can (i) repurpose problematic biochars, (ii) handle changing biochar material sources, e.g., seasonal and regional changes in the source of biomass, (iii) provide for custom features and functions of biochar for particular soils, regions or agricultural purposes; (iv) increase the retention properties of biochar, (v) provide for large volumes of biochar having desired and predictable properties, (vi) provide for biochar having custom properties, (vii) handle differences in biochar caused by variations in pyrolysis conditions or manufacturing of the "raw" biochar; and (viii) address the majority, if not all, of the problems that have, prior to the present invention, stifled the large scale adoption and use of biochars.

Treatment can impact both the interior and exterior pore surfaces, remove harmful chemicals, introduce beneficial substances, and alter certain properties of the biochar and the pore surfaces and volumes. This is in stark contrast to simple washing, contact, or immersion which generally only impacts the exterior surfaces and a small percentage of the interior surface area. Treatment can further be used to coat substantially all of the biochar pore surfaces with a surface modifying agent or impregnate the pore volume with additives or treatment to provide a predetermined feature to the biochar, e.g., surface charge and charge density, surface species and distribution, targeted nutrient addition, magnetic modifications, root growth facilitator, and water absorptivity and water retention properties. Just as importantly, treatment can also be used to remove undesirable substances from the biochar, such as dioxins or other toxins either through physical removal or through chemical reactions causing neutralization.

Figure 4:
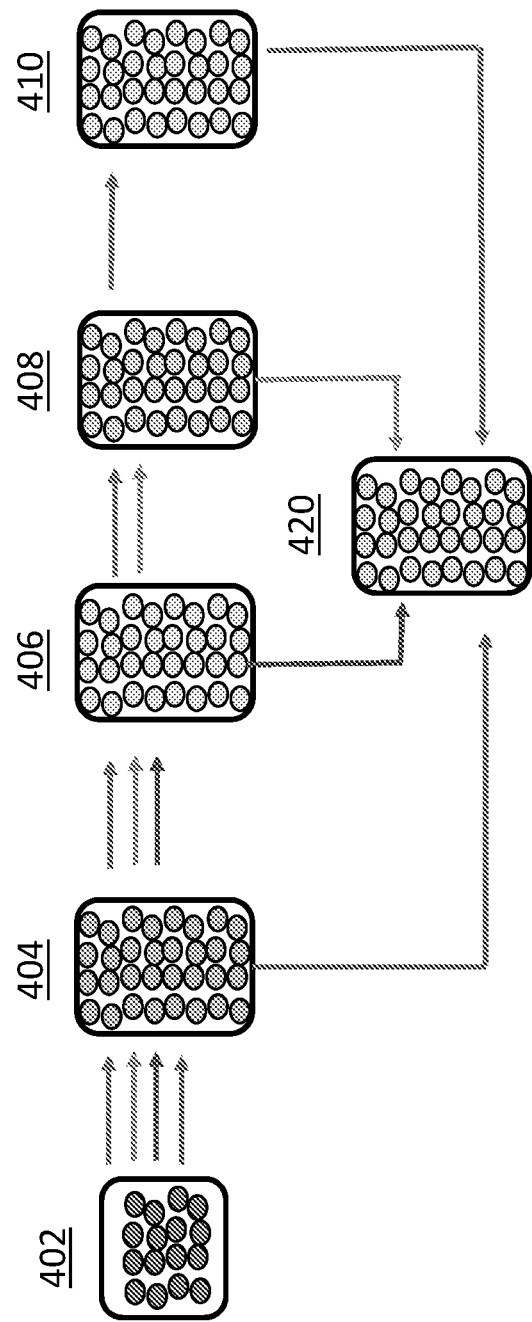
FIG. 4 is a flow chart process diagram of one implementation of a process for treating the raw biochar in accordance with the invention.

FIG. 4 is a schematic flow diagram of one example treatment process 400 for use in accordance with the present invention. As illustrated, the treatment process 400 starts with raw biochar 402 that may be subjected to one or more reactors or treatment processes prior to bagging 420 the treated biochar for resale. For example, 404 represents reactor 1, which may be used to treat the biochar. The treatment may be a simple water wash or may be an acid wash used for the purpose of altering the pH of the raw biochar particles 402. The treatment may also contain a surfactant or detergent to aid the penetration of the treatment solution into the pores of the biochar. The treatment may optionally be heated, cooled, or may be used at ambient temperature or any combination of the three. For some applications, depending upon the properties of the raw biochar, a water and/or acid/alkaline wash 404 (the latter for pH adjustment) may be the only necessary treatment prior to bagging the biochar 420. If, however, the moisture content of the biochar needs to be adjusted, the treated biochar may then be put into a second reactor 406 for purposes of reducing the moisture content in the washed biochar. From there, the treated and moisture adjusted biochar may be bagged 420.

Again, depending upon the starting characteristics of the raw biochar and the intended application for the resale product, further processing may still be needed or desired. In this case, the treated moisture adjusted biochar may then be passed to a third reactor 408 for inoculation, which may include the impregnation of biochar with beneficial additives, such as nutrients, bacteria, microbes, fertilizers or other additives. Thereafter, the inoculated biochar may be bagged 420, or may be yet further processed, for example, in a fourth reactor 410 to have further moisture removed from or added to the biochar. Further moisture adjustment may be accomplished by placing the inoculated biochar in a fourth moisture adjustment reactor 410 or circulating the biochar back to a previous moisture adjustment reactor (e.g. reactor 406). Those skilled in the art will recognize that the ordering in which the raw biochar is processed and certain processes may be left out, depending on the properties of the starting raw biochar and the desired application for the biochar. For example, the treatment and inoculation processes may be performed without the moisture adjustment step, inoculation processes may also be performed with or without any treatment, pH adjustment or any moisture adjustment. All the processes may be completed alone or in the conjunction with one or more of the others. It should also be noted that microbes themselves may be part of the process, not simply as an inoculant, but as an agent to convey materials into or out of the pore volume of the biochar.

Figure 4A:
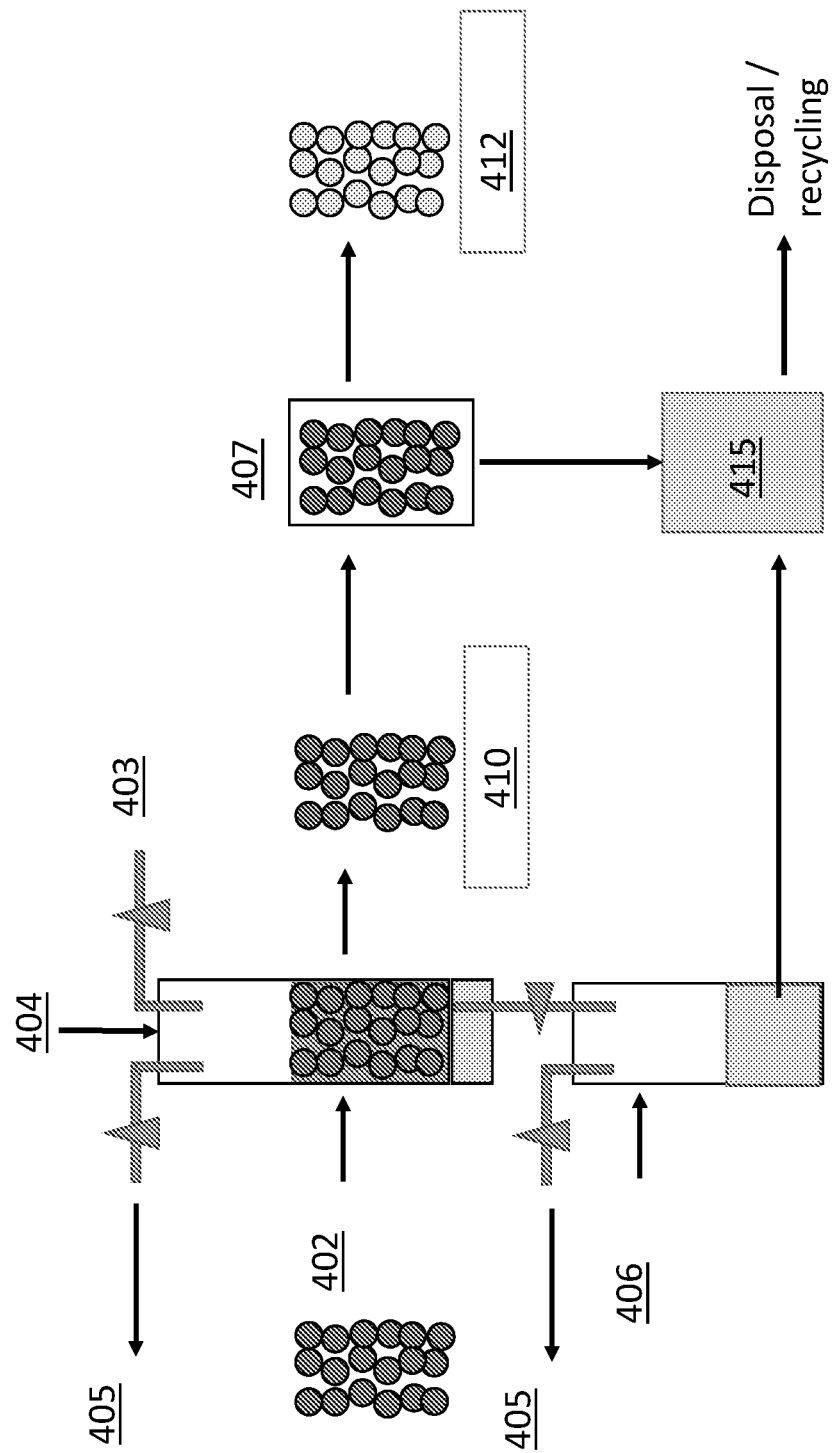
FIG. 4a illustrates a schematic of one example of an implementation of a biochar treat processes that that includes washing, pH adjustment and moisture adjustment.
Figure 4B:
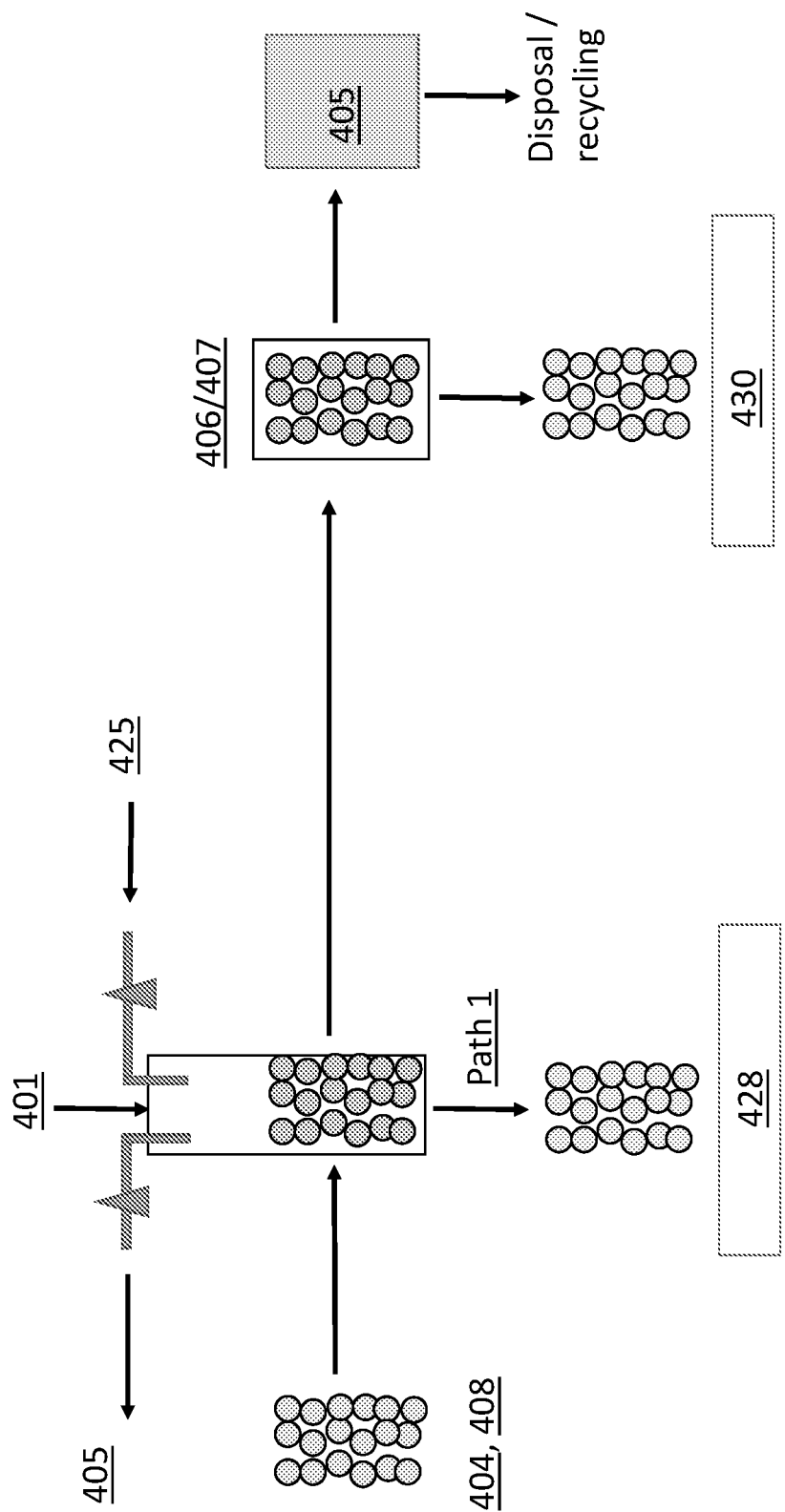
FIG. 4b illustrates yet another example of an implementation of a biochar treatment processing that includes inoculation.

For example, FIG. 4a illustrates a schematic of one example of an implementation of biochar processing that includes washing the pores and both pH and moisture adjustment. FIG. 4b illustrates yet another example of an implementation of biochar processing that includes inoculation.

As illustrated in FIG. 4a, raw biochar 402 is placed into a reactor or tank 404. A washing or treatment liquid 403 is then added to a tank and a partial vacuum, using a vacuum pump, 405 is pulled on the tank. The treating or washing liquid 403 may be used to clean or wash the pores of the biochar 402 or adjust the chemical or physical properties of the surface area or pore volume, such as pH level, usable pore volume, or VOC content, among other things. The vacuum can be applied after the treatment liquid 403 is added or while the treatment liquid 403 is added. Thereafter, the washed/adjusted biochar 410 may be moisture adjusted by vacuum exfiltration 406 to pull the extra liquid from the washed/moisture adjusted biochar 410 or may be placed in a centrifuge 407, heated or subjected to pressure gradient changes (e.g., blowing air) for moisture adjustment. The moisture adjusted biochar 412 may then be bagged or subject to further treatment. Any excess liquids 415 collected from the moisture adjustment step may be disposed of or recycled, as desired. Optionally, biochar fines may be collected from the excess liquids 415 for further processing, for example, to create a slurry, cakes, or biochar extrudates. It should be noted that in any of these steps, the residual gaseous environment in the tanks or centrifuges may be either ambient air, or a prescribed gas or combination of gasses to impact (through assistance or attenuation) reactivity during the process.

Optionally, rather than using a vacuum pump 405, a positive pressure pump may be used to apply positive pressure to the tank 404. In some situations, applying positive pressure to the tank may also function to force or accelerate the washing or treating liquid 403 into the pores of the biochar 402. Any change in pressure in the tank 404 or across the surface of the biochar could facilitate the exchange of gas and/or moisture into and out of the pores of the biochar with the washing or treating liquid 403 in the tank. Accordingly, changing the pressure in the tank and across the surface of the biochar, whether positive or negative, is within the scope of this invention. The atmosphere of the tank may be air or other gaseous mixture, prior to the intuition of the pressure change.

As illustrated FIG. 4b, the washed/adjusted biochar 410 or the washed/adjusted and moisture adjusted biochar 412 may be further treated by inoculating or impregnating the pores of the biochar with an additive 425. The biochar 410, 412 placed back in a reactor 401, an additive solution 425 is placed in the reactor 401 and a vacuum, using a vacuum pump, 405 is applied to the tank. Again, the vacuum can be applied after the additive solution 425 is added to the tank or while the additive solution 425 is being added to the tank. Thereafter, the washed, adjusted and inoculated biochar 428 can be bagged. Alternatively, if further moisture adjustment is required, the biochar can be further moisture adjusted by vacuum filtration 406 to pull the extra liquid from the washed/moisture adjusted biochar 410 or may be placed in a centrifuge 407 for moisture adjustment. The resulting biochar 430 can then be bagged. Any excess liquids 415 collected from the moisture adjustment step may be disposed of or recycled, as desired. Optionally, biochar particulates or "fines" which easily are suspended in liquid may be collected from the excess liquids 415 for further processing, for example, to create a slurry, biochar extrudates, or merely a biochar product of a consistently smaller particle size. As described above, both processes of the FIGS. 4a and 4b can be performed with a surfactant solution in place of, or in conjunction with, the vacuum 405.

While known processes exist for the above described processes, research associated with the present invention has shown improvement and the ability to better control the properties and characteristics of the biochar if the processes are performed through the infusion and diffusion of liquids into and out of the biochar pores. One such treatment process that can be used is vacuum impregnation and vacuum and/or centrifuge extraction. Another such treatment process that can be used is the addition of a surfactant to infused liquid, which infused liquid may be optionally heated, cooled, or used at ambient temperature or any combination of the three.

Since research associated with the present invention has identified what physical and chemical properties have the highest impact on plant growth and/or soil health, the treatment process can be geared to treat different forms of raw biochar to achieve treated biochar properties known to enhance these characteristics. For example, if the pH of the biochar needs to be adjusted to enhance the raw biochar performance properties, the treatment may be the infusion of an acid solution into the pores of the biochar using vacuum, surfactant, or other treatment means. This treatment of pore infusion through, for example, the rapid, forced infusion of liquid into and out the pores of the biochar, has further been proven to sustain the adjusted pH levels of the treated biochar for much longer periods than biochar that is simply immersed in an acid solution for the same period of time. By way of another example, if the moisture content needs to be adjusted, then excess liquid and other selected substances (e.g. chlorides, dioxins, and other chemicals, to include those previously deposited by treatment to catalyze or otherwise react with substances on the interior or exterior surfaces of the biochar) can be extracted from the pores using vacuum and/or centrifuge extraction or by using various heating techniques. The above describes a few examples of treatment that result in treated biochar having desired performance properties identified to enhance soil health and plant life or other applications.

Figure 5:
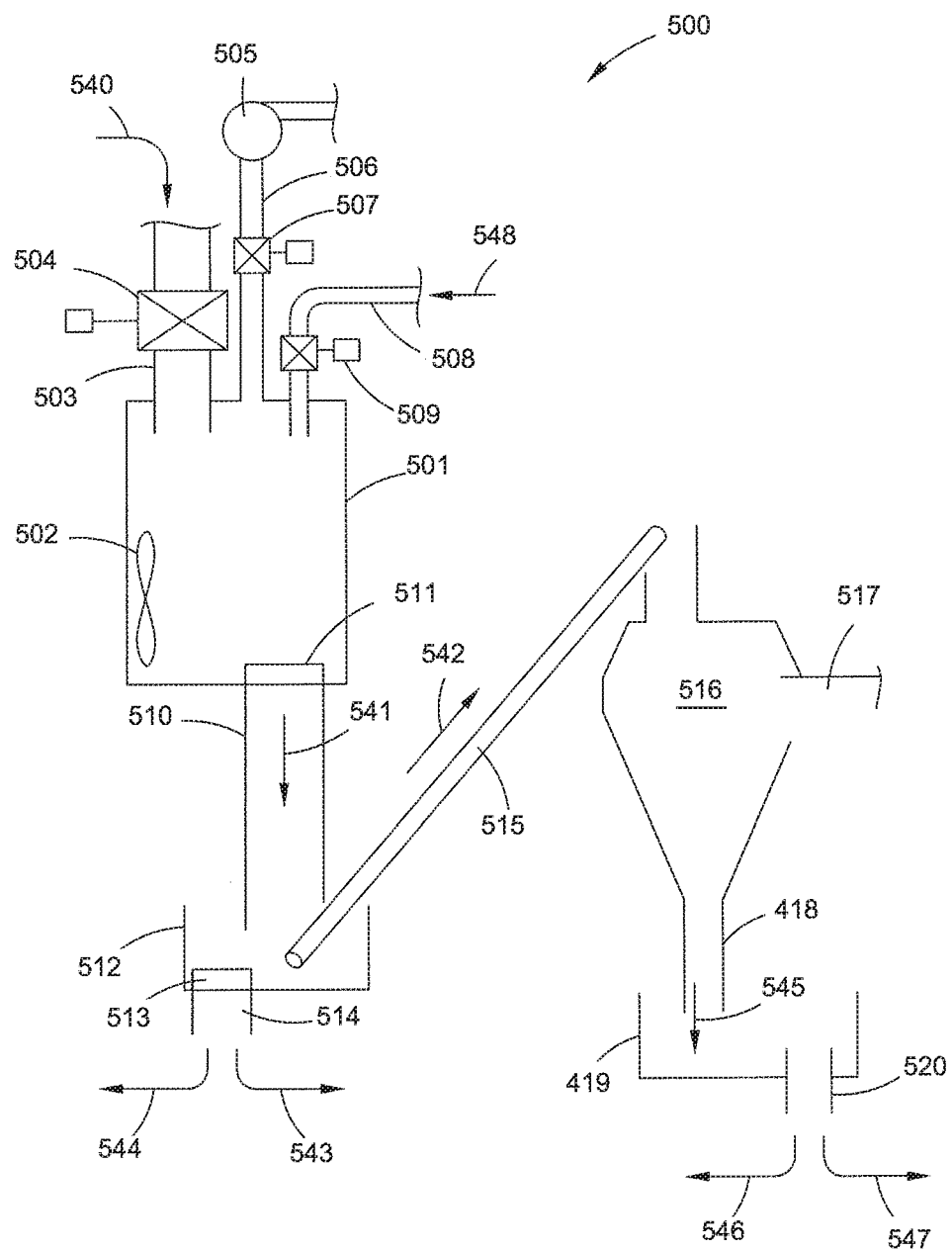
FIG. 5 is a schematic flow diagram of one example of a treatment system for use in accordance with the present invention.

FIG. 5 illustrates one example of a system 500 that utilizes vacuum impregnation to treat raw biochar. Generally, raw biochar particles, and preferably a batch of biochar particles, are placed in a reactor, which is connected to a vacuum pump, and a source of treating liquid (i.e. water or acidic/basis solution). When the valve to the reactor is closed, the pressure in the reactor is reduced to values ranging from 750 Torr to 400 Torr to 10 Torr or less. The biochar is maintained under vacuum ("vacuum hold time") for anywhere from seconds to 1 minute to 10 minutes, to 100 minutes, or possibly longer. By way of example, for about a 500 pound batch of untreated biochar, a vacuum hold time of from about 1 to about 5 minutes can be used if the reactor is of sufficient size and sufficient infiltrate is available to adjust the necessary properties. While under the vacuum the treating liquid may then be introduced into the vacuum chamber containing the biochar. Alternatively, the treating liquid may be introduced into the vacuum chamber before the biochar is placed under a vacuum. Optionally, treatment may also include subjecting the biochar to elevated temperatures from ambient to about 250° C. or reduced temperatures to about −25° C. or below, with the limiting factor being the temperature and time at which the infiltrate can remain flowable as a liquid or semi-liquid.

The infiltrate or treating liquid is drawn into the biochar pore, and preferably drawn into the macropores and mesopores. Depending upon the specific doses applied and pore structure of the biochar, the infiltrate can coat anywhere from 10% to 50% to 100% of the total macropore and mesopore surface area and can fill or coat anywhere from a portion to nearly all (10%-100%) of the total macropore and mesopore volume.

As described above, the treating liquid can be left in the biochar, with the batch being a treated biochar batch ready for packaging, shipment and use in an agricultural or other application. The treating liquid may also be removed through drying, treatment with heated gases, subsequent vacuum processing, centrifugal force (e.g., cyclone drying machines or centrifuges), dilution, or treatment with other liquids, with the batch being a treated biochar batch ready for packaging, shipment and use in an agricultural application. A second, third or more infiltration, removal, infiltration and removal, and combinations and variations of these may also be performed on the biochar with optional drying steps between infiltrations to remove residual liquid from and reintroduce gasses to the pore structure if needed. In any of these stages the liquid may contain organic or inorganic surfactants to assist with the penetration of the treating liquid.

As illustrated in FIG. 5, a system 500 for providing a biochar, preferably having predetermined and generally uniform properties. The system 500 has a vacuum infiltration tank 501. The vacuum infiltration tank 501 has an inlet line 503 that has a valve 504 that seals the inlet line 503. In operation, the starting biochar is added to vacuum infiltration tank 501 as shown by arrow 540. Once the tank is filled with the starting biochar, a vacuum is applied to the tank, by a vacuum pump connected to vacuum line 506, which also has valve 507. The starting biochar is held in the vacuum for a vacuum hold time. Infiltrate, as shown by arrow 548 is added to the tank 501 by line 508 having valve 509. The infiltrate is mixed with the biochar in the tank 501 by agitator 502. The mixing process is done under vacuum for a period of time sufficient to have the infiltrate fill the desired amount of pore volume, e.g., up to 100% of the macropores and mesopores.

Alternatively, the infiltrate may be added to the vacuum infiltration tank 501 before vacuum is pulled on the tank. Optionally, one or more selected gasses may be added to the tank. In this manner, infiltrate is added in the tank in an amount that can be impregnated into the biochar and optionally, the gasses introduced can also potentially impact the reactivity of the liquid as well as any organic or inorganic substances on the surface or in the pore volume of the biochar. As the vacuum is applied, the biochar is circulated in the tank to cause the infiltrate to fill the pore volume. To one skilled in the art, it should be clear that the agitation of the biochar during this process can be performed through various means, such as a rotating tank, rotating agitator, pressure variation in the tank itself, or other means. Additionally, the biochar may be dried using conventional means before even the first treatment. This optional pre-drying can remove liquid from the pores and in some situations may increase the efficiency of impregnation due to pressure changes in the tank.

Pressure is then restored in the tank 501 with either ambient air or a prescribed selection of gasses, and the infiltrated biochar is removed, as shown by arrow 541, from the tank 501 to bin 512, by way of a sealing gate 511 and removal line 510. The infiltrated biochar is collected in bin 512, where it can be further processed in several different ways. The infiltrated biochar can be shipped for use as a treated biochar as shown by arrow 543. The infiltrated biochar can be returned to the tank 501 (or a second infiltration tank). If returned to the tank 501 the biochar can be processed with a second infiltration step, a vacuum drying step, a washing step, or combinations and variations of these. The infiltrated biochar can be moved by conveyor 514, as shown by arrow 542, to a drying apparatus 516, e.g., a centrifugal dryer or heater, where water, infiltrate or other liquid is removed by way of line 517, and the dried biochar leaves the dryer through discharge line 518 as shown by arrow 545, and is collected in bin 519. The biochar is removed from the bin by discharge 520. The biochar may be shipped as a treated biochar for use in an agriculture application, as shown by arrow 547. The biochar may also be further processed, as shown by 546. Thus, the biochar could be returned to tank 501 (or a second vacuum infiltration tank) for a further infiltration step. The drying step may be repeated either by returning the dry biochar to the drying apparatus 516, or by running the biochar through a series of drying apparatus, until the predetermined dryness of the biochar is obtained, e.g., between 50% to less than 1% moisture.

The system 500 is illustrative of the system, equipment and processes that can be used for, and to carry out the present inventions. Various other implementations and types of equipment can be used. The vacuum infiltration tank can be a sealable off-axis rotating vessel, chamber or tank. It can have an internal agitator that also when reversed can move material out, empty it, (e.g., a vessel along the lines of a large cement truck, or ready mix truck, that can mix and move material out of the tank, without requiring the tank's orientation to be changed). Washing equipment may be added or utilized at various points in the process, or may be carried out in the vacuum tank, or drier, (e.g., wash fluid added to biochar as it is placed into the drier for removal). Other steps, such as bagging, weighing, the mixing of the biochar with other materials, e.g., fertilized, peat, soil, etc. can be carried out. In all areas of the system referring to vacuum infiltration, optionally positive pressure can be applied, if needed, to enhance the penetration of the infiltrate or to assist with re-infusion of gaseous vapors into the treated char. Additionally, where feasible, especially in positive pressure environments, the infiltrate may have soluble gasses added which then can assist with removal of liquid from the pores, or gaseous treatment of the pores upon equalization of pressure.

As noted above, the biochar may also be treated using a surfactant. The same or similar equipment used in the vacuum infiltration process can be used in the surfactant treatment process. Although it is not necessary to apply a vacuum in the surfactant treatment process, the vacuum infiltration tank or any other rotating vessel, chamber or tank can be used. In the surfactant treatment process, a surfactant, such as *yucca* extract, is added to the infiltrate, e.g., acid wash or water. The quantity of the surfactant added to the infiltrate may vary depending upon the surfactant used. For example, organic *yucca* extract can be added at a rate of between 0.1-20%, but more preferably 1-5% by volume of the infiltrate. The infiltrate with surfactant is then mixed with the biochar in a tumbler for several minutes, e.g., 3-5 minutes, without applied vacuum. Optionally, a vacuum or positive pressure may be applied with the surfactant to improve efficiency and penetration, but is not strictly necessary. Additionally, infiltrate to which the surfactant or detergent is added may be heated or may be ambient temperature or less. Similarly, the mixture of the surfactant or detergent, as well as the char being treated may be heated, or may be ambient temperature, or less. After tumbling, excess free liquid can be removed in the same manner as described above in connection with the vacuum infiltration process. Drying, also as described above in connection with the vacuum infiltration process, is an optional additional step. Besides *yucca* extract, a number of other surfactants may be used for surfactant treatment, which include, but are not limited to, the following: nonionic types, such as, ethoxylated alcohols, phenols—lauryl alcohol ethoxylates, Fatty acid esters—sorbitan, tween 20, amines, amides—imidazoles; anionic types, such as sulfonates—arylalkyl sulfonates and sulfate—sodium dodecyl sulfate; cationic types, such as alkyl—amines or ammoniums-quaternary ammoniums; and amphoteric types, such as betaines—cocamidopropyl betaine. Additionally biosurfactants, or microbes which produce biosurfactants such as *Flavobacterium* sp. may also be used.

Optionally, the biochar may also be treated by applying ultrasonics. In this treatment process, the biochar may be contacted with a treating liquid that is agitated by ultrasonic waves. By agitating the treating liquid, contaminants may be dislodged or removed from the biochar due to bulk motion of the fluid in and around the biocarbon, pressure changes, including cavitation in and around contaminants on the surface, as well as pressure changes in or near pore openings (cavitation bubbles) and internal pore cavitation.

In this manner, agitation will cause contaminants of many forms to be released from the internal and external structure of the biochar. The agitation also encourages the exchange of water, gas, and other liquids with the internal biochar structure. Contaminants are transported from the internal structure to the bulk liquid (treating fluid) resulting in biochar with improved physical and chemical properties. The effectiveness of ultrasonic cleaning is tunable as bubble size and number is a function of frequency and power delivered by the transducer to the treating fluid In one example, applying ultrasonic treatment, raw wood based biochar between 10 microns to 10 mm with moisture content from 0% to 90% may be mixed with a dilute mixture of acid and water (together the treating liquid) in a processing vessel that also translates the slurry (the biochar/treating liquid mixture). During translation, the slurry passes near an ultrasonic transducer to enhance the interaction between the fluid and biochar. The biochar may experience one or multiple washes of dilute acid, water, or other treating fluids. The biochar may also make multiple passes by ultrasonic transducers to enhance physical and chemical properties of the biochar. For example, once a large volume of slurry is made, it can continuously pass an ultrasonic device and be degassed and wetted to its maximum, at a rapid processing rate. The slurry can also undergo a separation process in which the fluid and solid biochar are separated at 60% effectiveness or greater.

Through ultrasonic treatment, the pH of the biochar, or other physical and chemical properties may be adjusted and the mesopore and macropore surfaces of the biochar may be cleaned and enhanced. Further, ultrasonic treatment can be used in combination with bulk mixing with water, solvents, additives (fertilizers, etc.), and other liquid based chemicals to enhance the properties of the biochar. After treatment, the biochar may be subject to moisture adjustment, further treatment and/or inoculation using any of the methods set forth above. In certain applications, ultrasonic technology may also be used to modify (usually reduce) the size of the biochar particles while retaining much, most, or nearly all of the porosity and pore structure. This yields smaller size particles with different morphologies than other methods of sizing such as grinding, crushing, sieving, or shaking.

C. Impact of Treatment

As illustrated above, the treatment process, whether using pressure changes (e.g. vacuum), surfactant or ultrasonic treatment, or a combination thereof, may include two steps, which in certain applications, may be combined: (i) washing and (ii) inoculation of the pores with an additive. When the desired additive is the same and that being inoculated into the pores, e.g., water, the step of washing the pores and inoculating the pores with an additive may be combined.

While not exclusive, washing is generally done for one of three purposes: (i) to modify the surface of the pore structure of the biochar (i.e., to allow for increased retention of liquids); (ii) to modify the pH of the biochar; and/or (iii) to remove undesired and potentially harmful compounds or gases.

Testing has further demonstrated that if the biochar is treated, at least partially, in a manner that causes the infusion and/or effusion of liquids and/or vapors into and/or out of the biochar pores (through mechanical, physical, biological, or chemical means), certain beneficial properties of the biochar can be altered, enhanced or improved through treatment. By knowing the properties of the raw biochar and the optimal desired properties of the treated biochar, the raw biochar can then be treated in a manner that results in the treated biochar having controlled optimized properties and greater levels of consistency between batches as well as between treated biochars arising from various feedstocks.

Using the treatment processes described above, or other treatments that provide, in part, for the infusion and/or effusion of liquids and/or vapors into and/or out of the biochar pores, biochars can have improved physical and chemical properties over raw biochar.

1. Water Holding/Retention Capacity

As demonstrated below, the treatment processes of the invention modify the surfaces of the pore structure to provide enhanced functionality and to control the properties of the biochar to achieve consistent and predicable performance. Using the above treatment processes, anywhere from at least 10% of the total pore surface area up to 90% or more of the total pore surface area may be modified. In some implementations, it may be possible to achieve modification of up to 99% or more of the total pore surface area of the biochar particle. Using the processes set forth above, such modification may be substantially and uniformly achieved for an entire batch of treated biochar.

For example, it is believed that by treating the biochar as set forth above, the hydrophilicity of the surface of the pores of the biochar is modified, allowing for a greater water retention capacity. Further, by treating the biochars as set forth above, gases and other substances are also removed from the pores of the biochar particles, also contributing to the biochar particles' increased water holding capacity. Thus, the ability of the biochar to retain liquids, whether water or additives in solution, is increased, which also increases the ability to load the biochar particles with large volumes of inoculant, infiltrates and/or additives.

A batch of biochar has a bulk density, which is defined as weight in grams (g) per cm$^3$ of loosely poured material that has or retains some free space between the particles. The biochar particles in this batch will also have a solid density, which is the weight in grams (g) per cm$^3$ of just particles, i.e., with the free space between the particles removed. The solid density includes the air space or free space that is contained within the pores, but not the free space between particles. The actual density of the particles is the density of the material in grams (g) per cm$^3$ of material, which makes up the biochar particles, i.e., the solid material with pore volume removed.

In general, as bulk density increases the pore volume would be expected to decrease and, if the pore volume is macro or mesoporous, with it, the ability of the material to hold infiltrate, e.g., inoculant. Thus, with the infiltration processes, the treated biochars can have impregnation capacities that are larger than could be obtained without infiltration, e.g., the treated biochars can readily have 10%, 30%, 40%, 50%, or most preferably, 60%-100% of their total pore volume filled with an infiltrate, e.g., an inoculant. The impregnation capacity is the amount of a liquid that a biochar particle, or batch of particles, can absorb. The ability to make the pores surface hydrophilic, and to infuse liquid deep into the pore structure through the application of positive or negative pressure and/or a surfactant, alone or in combination, provides the ability to obtain these high impregnation capabilities. The treated biochars can have impregnation capacities, i.e., the amount of infiltrate that a particle can hold on a volume held/total volume of a particle basis, that is greater than 0.2 cm$^3$/cm$^3$ to 0.8 cm$^3$/cm$^3$.

Figure 6:
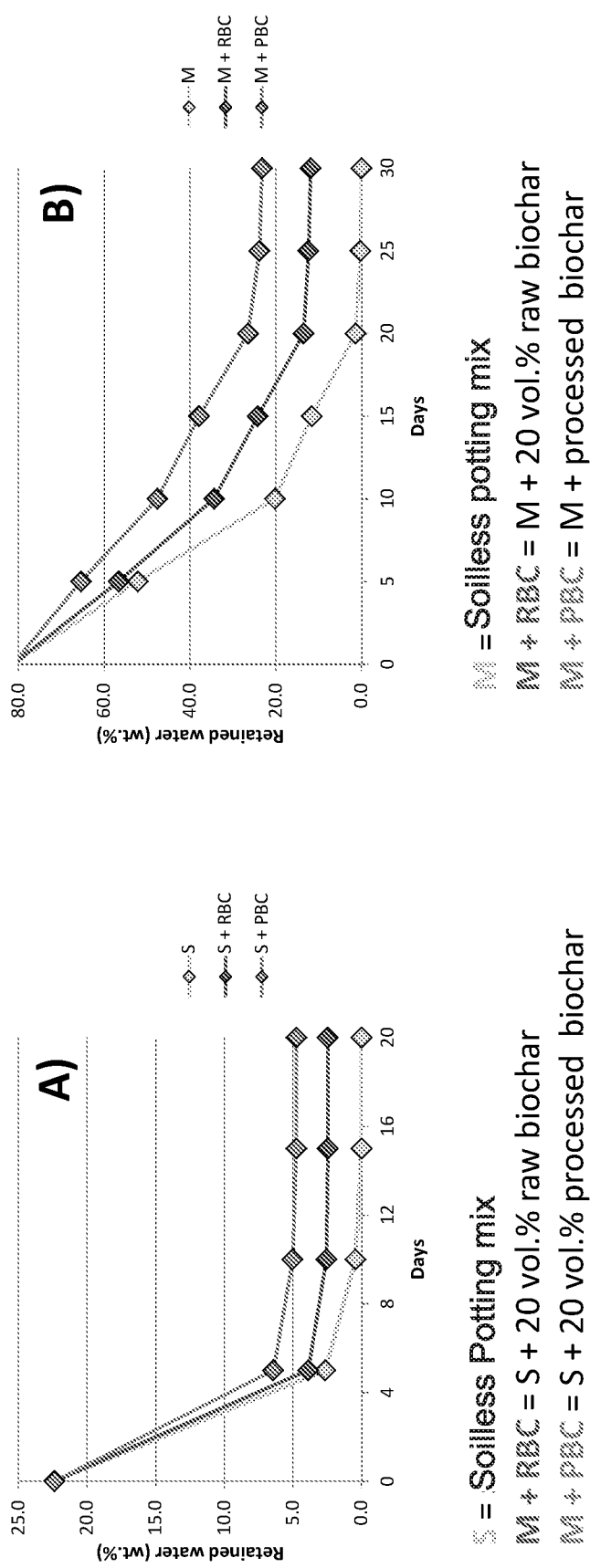
FIG. 6 is a chart showing the water holding capacities of treated biochar as compared to raw biochar and sandy clay loam soil and as compared to raw biochar and soilless potting soil.

Accordingly, by using the treatment above, the water retention capacity of biochar can be greatly increased over the water retention capacities of various soil types and even raw biochar, thereby holding water and/or nutrients in the plant's root zone longer and ultimately reducing the amount of applied water (through irrigation, rainfall, or other means) needed by up to 50% or more. FIG. 6 has two charts showing the water retention capacities of planting substrates versus when mixed with raw and treated biochar. In this example, the raw and treated biochar are derived from coconut biomass. The soils sampled are loam and sandy clay soil and a common commercial horticultural peat and perlite soilless potting mix. The charts show the retained water as a function of time.

In chart A of FIG. 6, the bottom line represents the retained water in the sandy claim loam soil over time. The middle line represents the retained water in the sandy clay soil with 20% by volume percent of unprocessed raw biochar. The top line represents the retained water in the sandy clay loam soil with 20% by volume percent of treated biochar (adjusted and inoculated biochar). Chart B of FIG. 6 represents the same using peat and perlite soilless potting mix rather than sandy clay loam soil.

Figure 7:
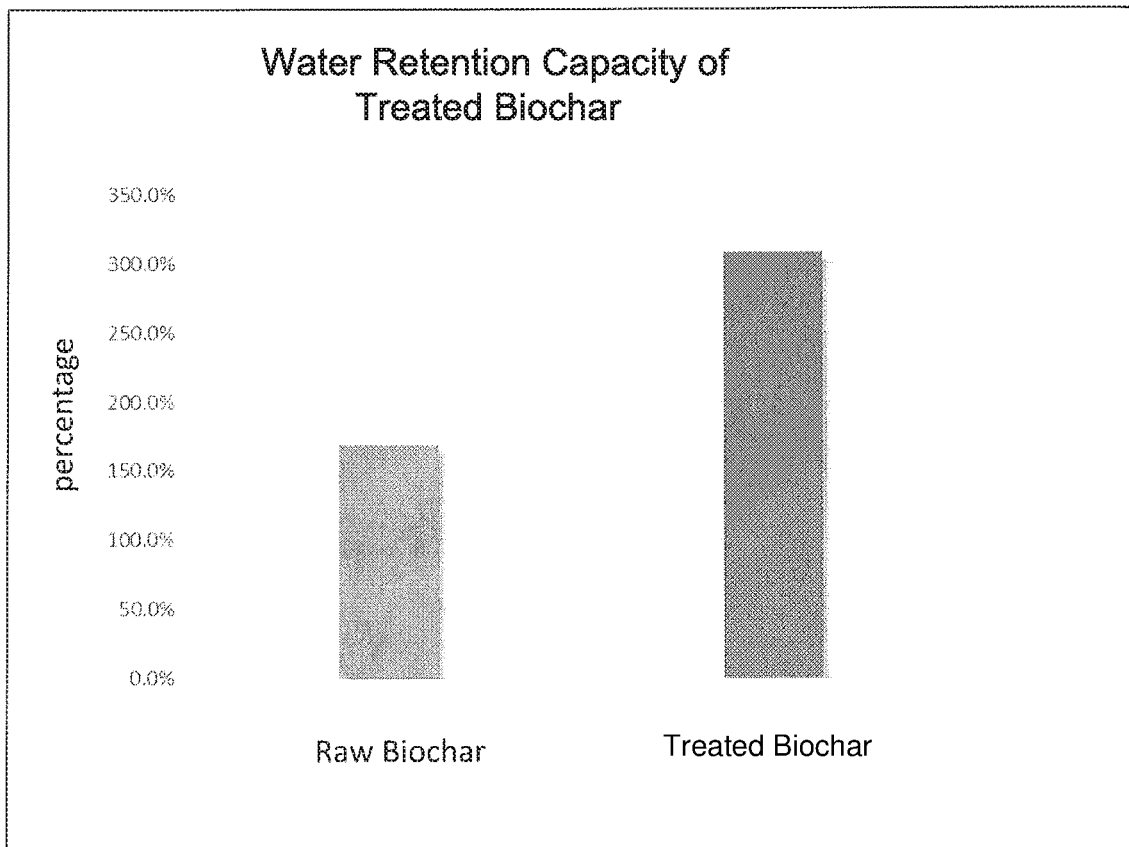
FIG. 7 illustrates the different water retention capacities of raw biochar versus treated biochar measured gravimetrically.

As illustrated in FIG. 7 the treated biochar has an increased water retention capacity over raw biochar of approximately 1.5 times the raw biochar. Similarly, testing of treated biochar derived from pine have also shown an approximate 1.5 times increase in water retention capacity over raw biochar. With certain biochar, the water retention capacity of treated biochar could be as great as three time that of raw biochar.

"Water holding capacity," which may also be referred to as "Water Retention Capacity," is the amount of water that can be held both internally within the porous structure and in the interparticle void spaces in a given batch of particles. While a summary of the method of measure is provided above, a more specific method of measuring water holding capacity/water retention capacity is measured by the following procedure: (i) drying a sample of material under temperatures of 105° C. for a period of 24 hours or using another scientifically acceptable technique to reduce the moisture content of the material to less than 2%, less than 1%; and preferably less than 0.5% (ii) placing a measured amount of dry material in a container; (iii) filling the container having the measured amount of material with water such that the material is completely immersed in the water; (iv) letting the water remain in the container having the measured amount of material for at least ten minutes or treating the material in accordance with the invention by infusing with water when the material is a treated biochar; (v) draining the water from the container until the water ceases to drain; (vi) weighing the material in the container (i.e., wet weight); (vii) again drying the material by heating it under temperatures of 105° C. for a period of 24 hours or using another scientifically acceptable technique to reduce the moisture content of the material to less than 2% and preferably less than 1%; and (viii) weighing the dry material again (i.e., dry weight) and, for purposes of a volumetric measure, determining the volume of the material.

Measured gravimetrically, the water holding/water retention capacity is determined by measuring the difference in weight of the material from step (vi) to step (viii) over the weight of the material from step (viii) (i.e., wet weight-dry weight/dry weight). FIG. 7 illustrates the different water retention capacities of raw biochar versus treated biochar measured gravimetrically. As illustrated, water retention capacity of raw biochar can be less than 200%, whereas treated biochar can have water retention capacities measured gravimetrically greater than 100%, and preferably between 200 and 400%.

Water holding capacity can also be measured volumetrically and represented as a percent of the volume of water retained in the biochar after gravitationally draining the excess water/volume of biochar The volume of water retained in the biochar after draining the water can be determined from the difference between the water added to the container and water drained off the container or from the difference in the weight of the wet biochar from the weight of the dry biochar converted to a volumetric measurement. This percentage water holding capacity for treated biochar may be 30% and above by volume, and preferably 50-55 percent and above by volume.

Given biochar's increased water retention capacity, the application of the treated biochar and even the raw biochar can greatly assist with the reduction of water and/or nutrient application. It has been discovered that these same benefits can be imparted to agricultural growth.

2. Plant Available Water

Figure 8:
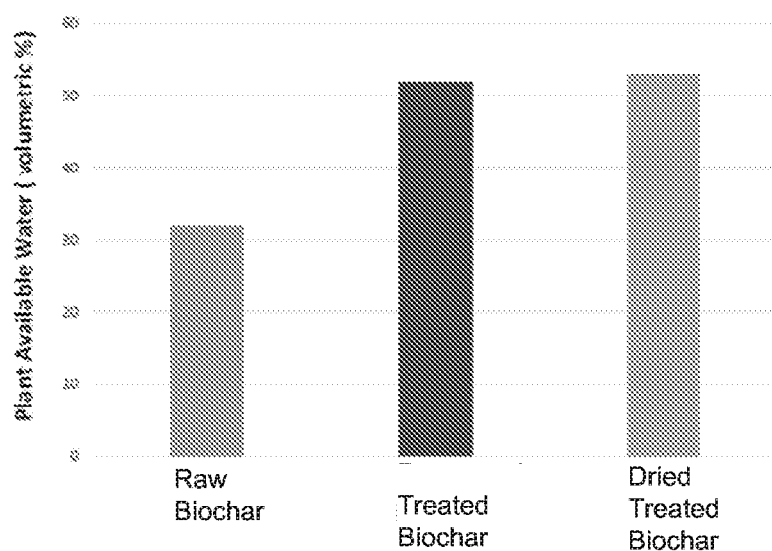
FIG. 8 is a chart showing the plant available water of raw biochar compared to treated biochar (wet and dry).

As illustrated in FIG. 8, plant available water is greatly increased in treated biochar over that of raw biochar. FIG. 8 illustrates the plant available water in raw biochar, versus treated biochar and treated dried biochar and illustrates that treated biochar can have a plant available water percent of greater than 35% by volume.

"Plant Available Water" is the amount of unbound water in the material available for plants to uptake. This is calculated by subtracting the water content at permanent wilting point from the water content at field capacity, which is the point when no water is available for the plants. Field capacity is generally expressed as the bulk water content retained at −33 J/kg (or −0.33 bar) of hydraulic head or suction pressure. Permanent wilting point is generally expressed as the bulk water content retained at −1500 J/kg (or −15.0 bar) of hydraulic head or suction pressure. Methods for measuring plant available water are well-known in the industry and use pressure plate extractor, which are commercially available or can be built using well-known principles of operation.

3. Remaining Water Content

Treated biochar of the present invention has also demonstrated the ability to retain more water than raw biochar after exposure to the environment for defined periods of time. For purposes of this application "remaining water content" can be defined as the total amount of water that remains held by the biochar after exposure to the environment for certain amount of time. Exposure to environment is exposure at ambient temperature and pressures. Under this definition, remaining water content can be may be measured by (i) creating a sample of biochar that has reached its maximum water holding capacity; (ii) determining the total water content by thermogravimetric analysis (H2O (TGA)), as described above on a sample removed from the output of step (i) above, (iii) exposing the biochar in the remaining sample to the environment for a period of 2 weeks (15 days, 360 hrs.); (iv) determining the remaining water content by thermogravimetric analysis (H2O (TGA)); and (v) normalizing the remaining (retained) water in mL to 1 kg or 1 L biochar. The percentage of water remaining after exposure for this two-week period can be calculated by the remaining water content of the biochar after the predetermine period over the water content of the biochar at the commencement of the two-week period. Using this test, treated biochar has shown to retain water at rates over 4× that of raw biochar. Testing has further demonstrated that the following amount of water can remain in treated biochar after two weeks of exposure to the environment: 100-650 mL/kg; 45-150 mL/L; 12-30 gal/ton; 3-10 gal/yd3 after 360 hours (15 days) of exposure to the environment. In this manner, and as illustrated in FIG. 12, biochar treated through vacuum impregnation can increase the amount of retained water in biochar about 3× compared to other methods even after seven weeks. In general, the more porous and the higher the surface area of a given material, the higher the water retention capacity. Further, it is theorized that by modifying the hydrophilicity/hydrophobicity of the pore surfaces, greater water holding capacity and controlled release may be obtained. Thus, viewed as a weight percent, e.g., the weight of retained water to weight of biochar, examples of the present biochars can retain more than 5% of their weight, more than 10% of their weight, and more than 15% of their weight, and more compared to an average soil which may retain 2% or less, or between 100-600 ml/kg by weight of biochar Tests have also shown that treated biochars that show weight loss of >1% in the interval between 43-60° C. when analyzed by the Thermal Gravimetric Analysis (TGA) (as described below) demonstrate greater water holding and content capacities over raw biochars. Weight loss of >5%-15% in the interval between 38-68° C. when analyzed by the Thermal Gravimetric Analysis (TGA) using sequences of time and temperature disclosed in the following paragraphs or others may also be realized. Weight percentage ranges may vary from between >1%-15% in temperature ranges between 38-68° C., or subsets thereof, to distinguish between treated biochar and raw biochar.

Figure 9:
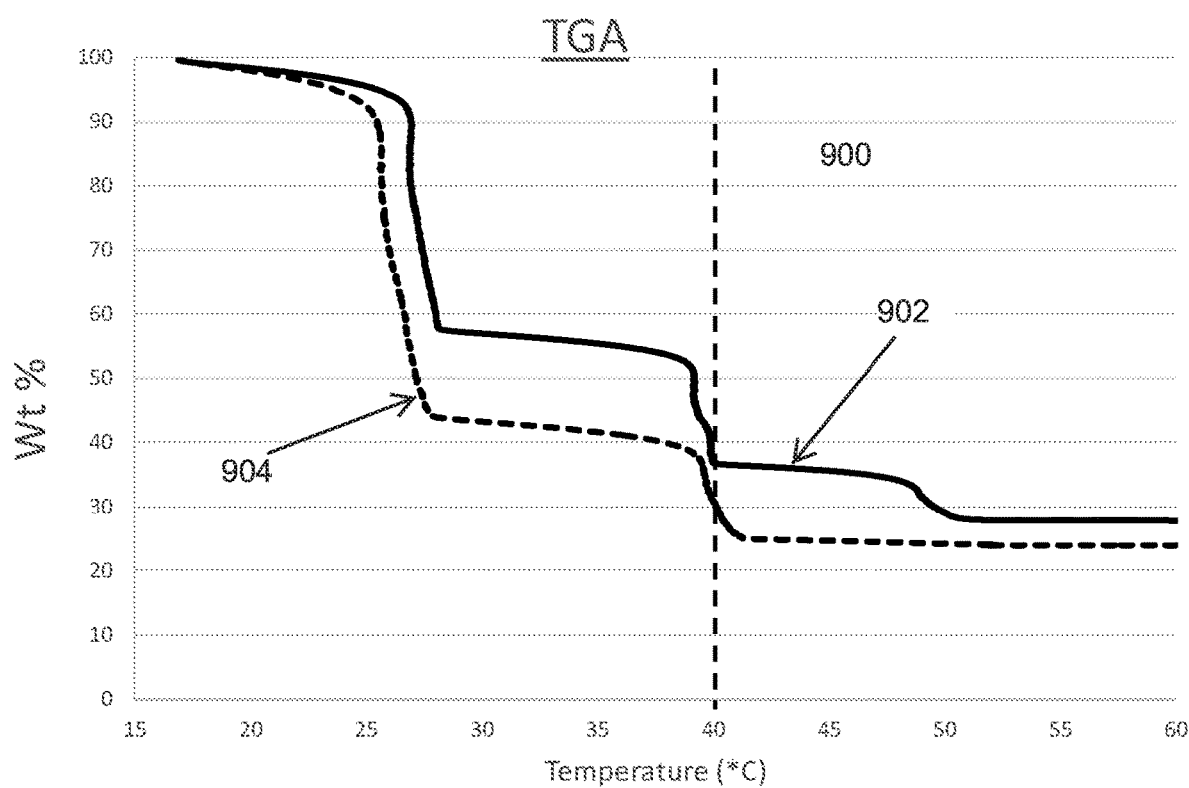
FIG. 9 is a chart showing the weight loss of treated biochars verses raw biochar samples when heated at varying temperatures using a TGA testing method.

FIG. 9 is a chart 900 showing the weight loss of treated biochars 902 verses raw biochar samples 904 when heated at varying temperatures using the TGA testing described below. As illustrated, the treated biochars 902 continue to exhibit weight loss when heated between 40-60° C. when analyzed by the Thermal Gravimetric Analysis (TGA) (described below), whereas the weight loss in raw biochar 904 between the same temperature ranges levels off. Thus, testing demonstrates the presence of additional moisture content in treated biochars 902 versus raw biochars 904.

In particular, the treated biochars 902 exhibit substantial water loss when heated in inert gas such as nitrogen. More particularly, when heated for 25 minutes at each of the following temperatures 20, 30, 40, 50 and 60 degrees Celsius, ° C. the treated samples lose about 5-% to 15% in the interval 43-60° C. and upward of 20-30% in the interval between 38-68° C. The samples to determine the water content of the raw biochar were obtained by mixing a measured amount of biochar and water, stirring the biochar and water for 2 minutes, draining off the water, measuring moisture content and then subjecting the sample to TGA. The samples for the treated biochar were obtained by using the same measured amount of biochar as used in the raw biochar sample, and impregnating the biochar under vacuum. Similar results are expected with biochar treated with a treatment process consistent with those described in this disclosure with the same amount of water as used with the raw biochar. The moisture content is then measured and the sample is subjected to TGA described above.

The sequences of time and temperature conditions for evaluating the effect of biochars heating in inert atmosphere is defined in this application as the "Bontchev-Cheyne Test" ("BCT"). The BCT is run using samples obtained, as described above, and applying Thermal Gravimetric Analysis (TGA) carried out using a Hitachi STA 7200 analyzer under nitrogen flow at the rate of 110 mL/min. The biochar samples are heated for 25 minutes at each of the following temperatures: 20, 30, 40, 50 and 60° C. The sample weights are measured at the end of each dwell step, at the beginning and at the end of the experiment. The analyzer also continually measures and records weight over time. Biochars having enhanced water holding or retention capacities are those that exhibit weight loss of >5% in the interval between 38-68° C., >1% in the interval between 43-60° C. Biochars with greater water holding or retention capacities can exhibit >5% weight loss in the interval between 43-60° C. measured using the above described BCT.

D. Impregnation and/or Inoculation with Infiltrates or Additives

In addition to mitigating or removing deleterious pore surface properties, by treating the pores of the biochar through a forced, assisted, accelerate or rapid infiltration process, such as those described above, the pore surface properties of the biochar can be enhanced. Such treatment processes may also permit subsequent processing, may modify the pore surface to provide predetermined properties to the biochar, and/or provide combinations and variations of these effects. For example, it may be desirable or otherwise advantageous to coat substantially all, or all of the biochar macropore and mesopore surfaces with a surface modifying agent or treatment to provide a predetermined feature to the biochar, e.g., surface charge and charge density, surface species and distribution, targeted nutrient addition, magnetic modifications, root growth facilitator, and water absorptivity and water retention properties.

By infusing liquids into the pores of biochar, it has been discovered that additives infused within the pores of the biochar provide a time release effect or steady flow of some beneficial substances to the root zones of the plants and also can improve and provide a more beneficial environment for microbes which may reside or take up residence within the pores of the biochar. In particular, additive infused biochars placed in the soil prior to or after planting can dramatically reduce the need for high frequency application of additives, minimize losses caused by leaching and runoff and/or reduce or eliminate the need for controlled release fertilizers. They can also be exceptionally beneficial in animal feed applications by providing an effective delivery mechanism for beneficial nutrients, pharmaceuticals, enzymes, microbes, or other substances.

For purposes of this application, "infusion" of a liquid or liquid solution into the pores of the biochar means the introduction of the liquid or liquid solution into the pores of the biochar by a means other than solely contacting the liquid or solution with the biochar, e.g., submersion. The infusion process, as described in this application in connection with the present invention, includes a mechanical, chemical or physical process that facilitates or assist with the penetration of liquid or solution into the pores of the biochar, which process may include, but not be limited to, positive and negative pressure changes, such as vacuum infusion, surfactant infusion, or infusion by movement of the liquid and/or biochar (e.g., centrifugal force, steam and/or ultrasonic waves) or other method that facilitates, assists, forces or accelerates the liquid or solution into the pores of the biochar. Prior to infusing the biochar, the biochar, as described in detail above, may be washed and/or moisture adjusted.

Figure 10:
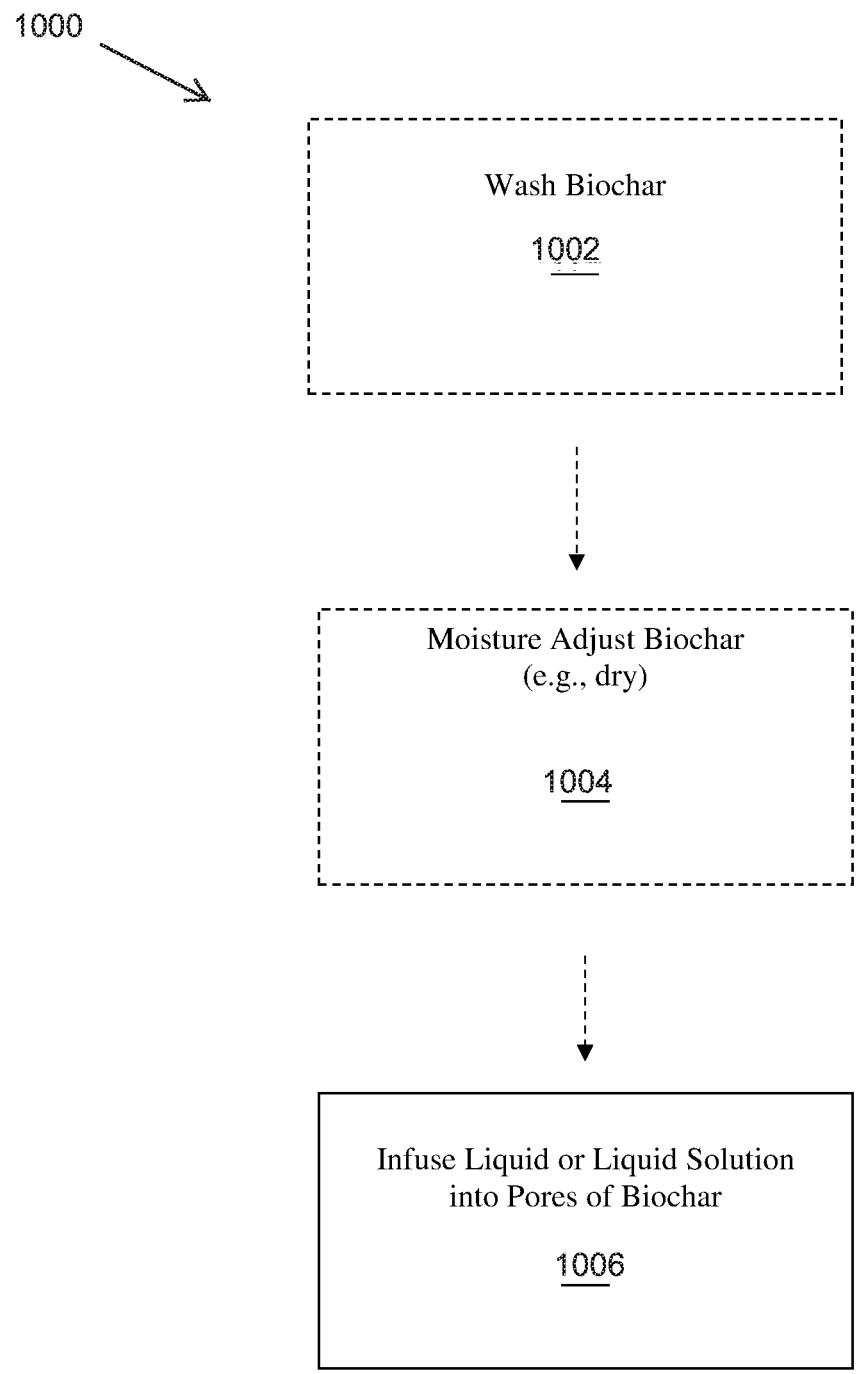
FIG. 10 is a flow diagram showing one example of a method for infusing biochar.

FIG. 10 is a flow diagram 1000 of one example of a method for infusing biochar with an additive. Optionally, the biochar may first be washed or treated at step 1002, the wash may adjust the pH of the biochar, as described in more detail above, or may be used to remove elemental ash and other harmful organics that may be unsuitable for the desired infused fertilizer. Optionally, the moisture content of the biochar may then be adjusted by drying the biochar at step 1004, also as described in further detail above, prior to infusion of the additive or inoculant at step 1006.

In summary, the infusion process may be performed with or without any washing, prior pH adjustment or moisture content adjustment. Optionally, the infusion process may be performed with the wash and/or the moisture adjustment step. All the processes may be completed alone or in the conjunction with one or more of the others.

Through the above process of infusing the additive into the pores of the biochar, the pores of the biochar may be filled by 25%, up to 100%, with an additive solution, as compared to 1-20% when the biochar is only submerged in the solution or washed with the solution for a period of less than twelve hours. Higher percentages may be achieved by washing and/or drying the pores of the biochar prior to infusion.

Data have been gathered from research conducted comparing the results of soaking or immersion of biochar in liquid versus vacuum impregnation of liquid into biochar. These data support the conclusion that vacuum impregnation provides greater benefits than simple soaking and results in a higher percentage volume of moisture on the surface, interstitially and in the pores of the biochar.

Figure 11:
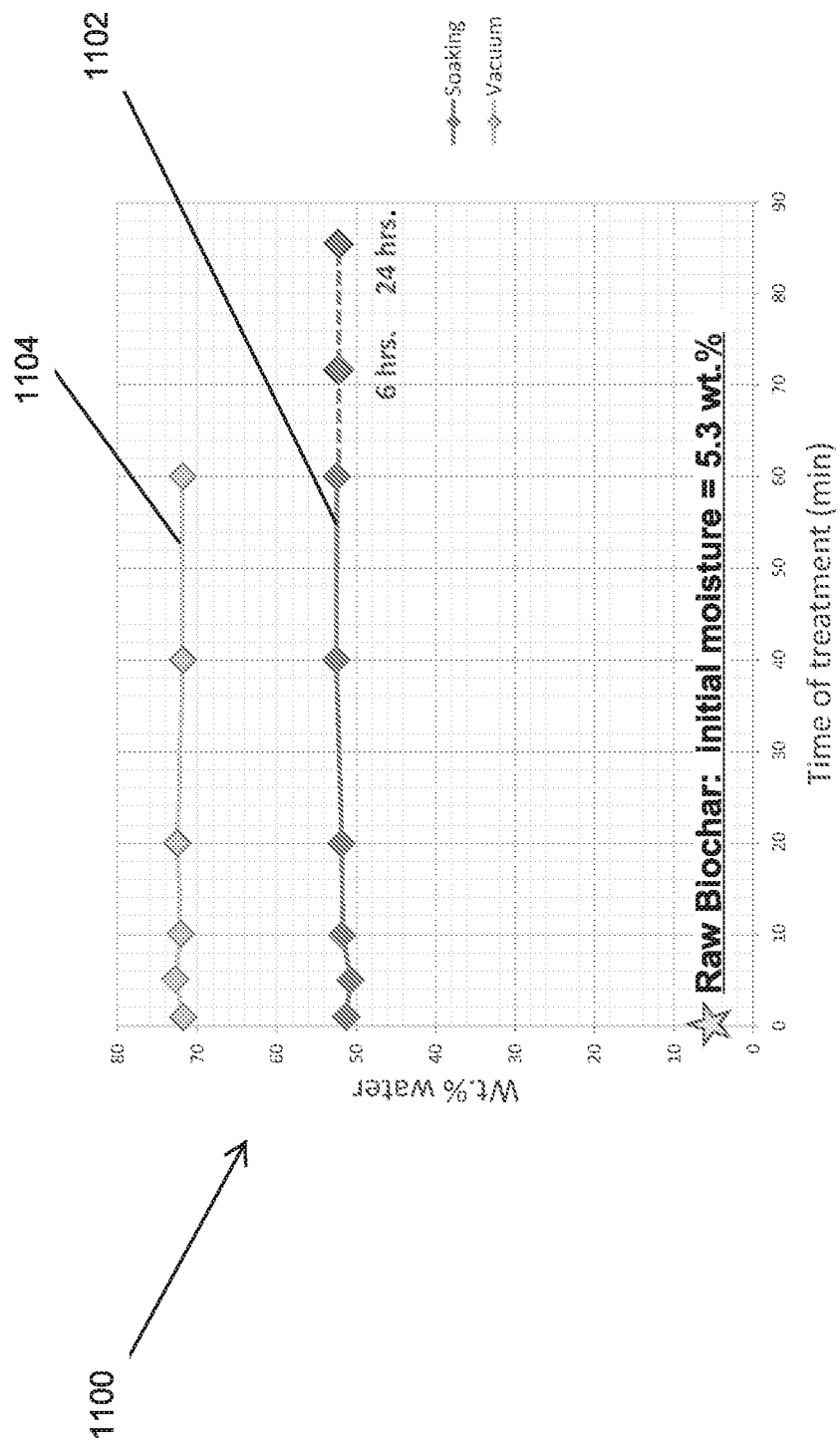
FIG. 11 illustrates the improved liquid content of biochar using vacuum impregnation as against soaking the biochar in liquid.

In one experiment, equal quantities of pine biochar were mixed with equal quantities of water, the first in a beaker, the second in a vacuum flask. The mixture in the beaker was continuously stirred for up to 24 hours, then samples of the suspended solid were taken, drained and analyzed for moisture content. The mixture in the vacuum flask was connected to a vacuum pump and negative pressure of 15" was applied. Samples of the treated solid were taken, drained and analyzed for moisture content. FIG. 11 is a chart illustrating the results of the experiment. The lower graph 1102 of the chart, which shows the results of soaking over time, shows a wt. % of water of approximately 52%. The upper graph 1104 of the chart, which shows the results of vacuum impregnation over time, shows a wt. % of water of approximately 72%.

Figures 12A, 12B:
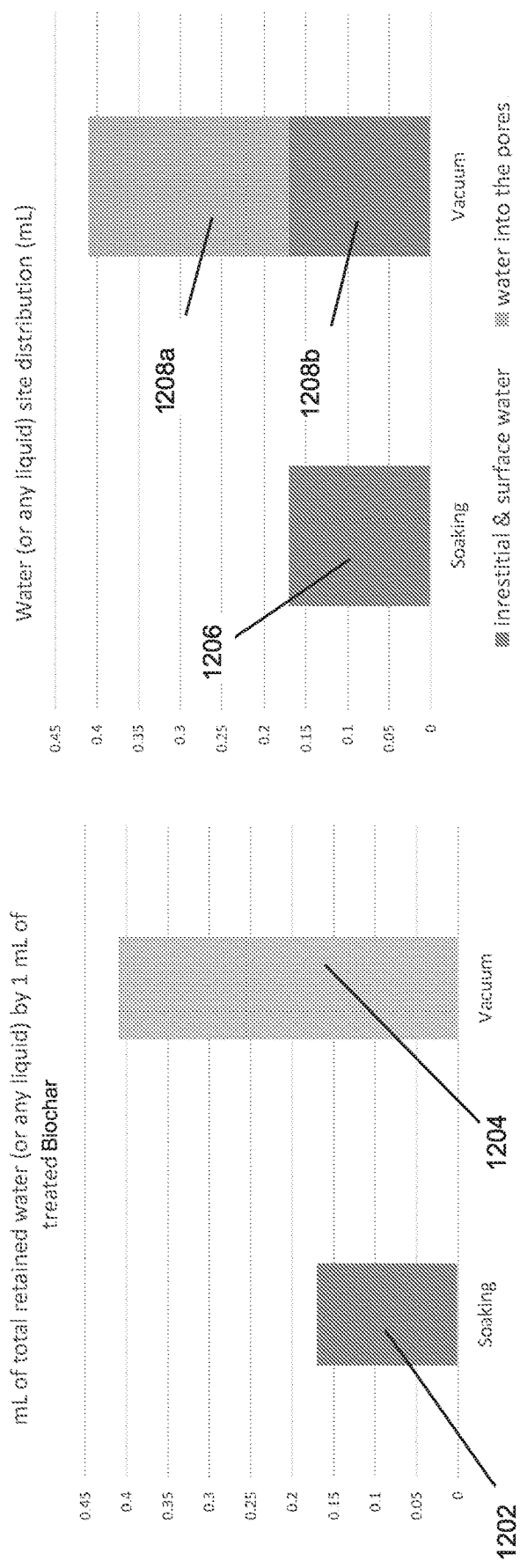
FIG. 12a is a chart comparing total retained water of treated biochar after soaking and after vacuum impregnation.
FIG. 12b is a chart comparing water on the surface, interstitially and in the pores of biochar after soaking and after vacuum impregnation.

FIGS. 12a and 12b show two charts that further illustrate that the total water and/or any other liquid content in processed biochar can be significantly increased using vacuum impregnation instead of soaking. FIG. 12a compares the mL of total water or other liquid by retained by 1 mL of treated pine biochar. The graph 1202 shows that approximately 0.17 mL of water or other liquid are retained through soaking, while the graph 1204 shows that approximately 0.42 mL of water or other liquid are retained as a result of vacuum impregnation. FIG. 12b shows that the retained water of pine biochar subjected to soaking consists entirely of surface and interstitial water 1206, while the retained water of pine biochar subjected to vacuum impregnation consists not only of surface and interstitial water 1208a, but also water impregnated in the pores of the biochar 1208b.

Figure 13:
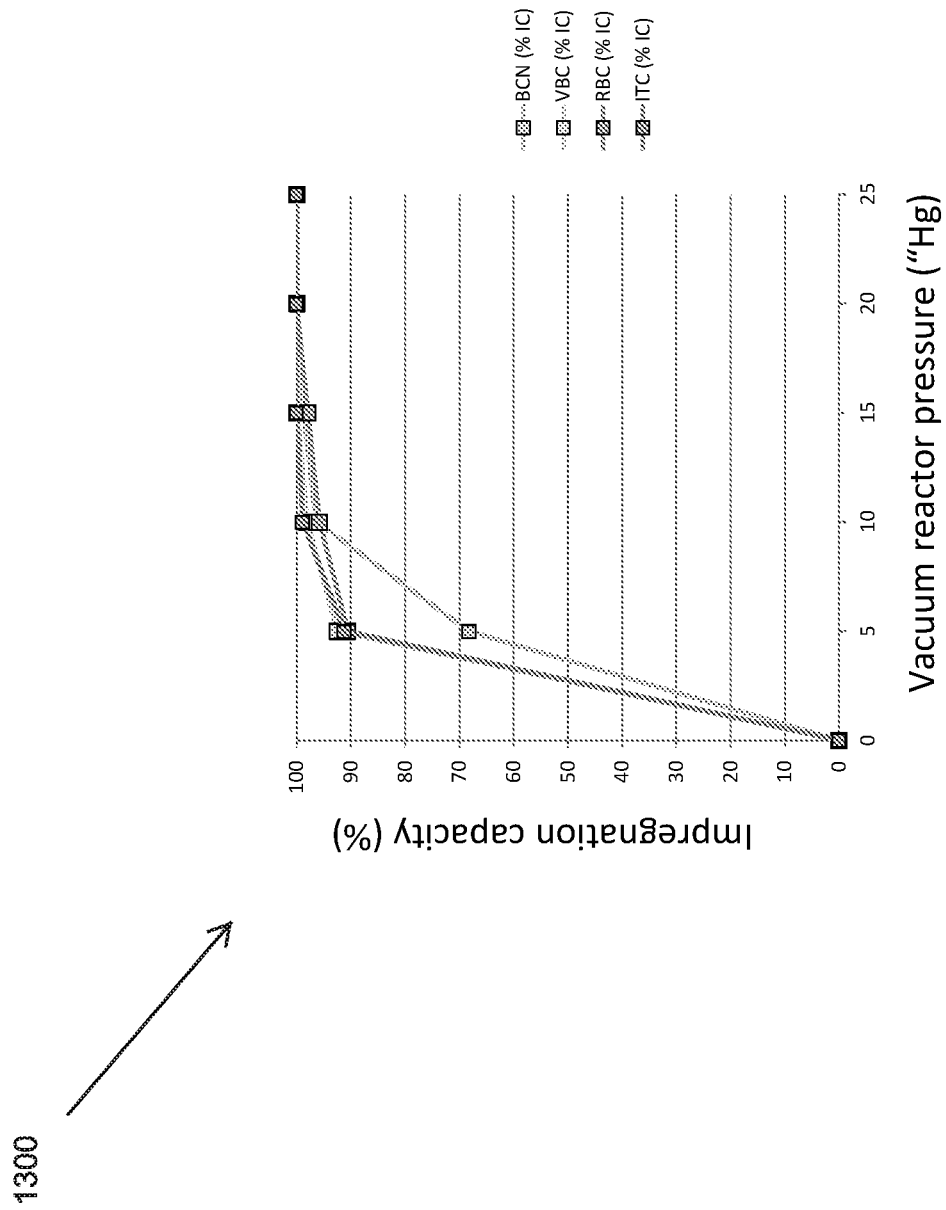
FIG. 13 illustrates how the amount of water or other liquid in the pores of vacuum processed biochars can be increased varied based upon the applied pressure.

In addition, as illustrated by FIG. 13, the amount of moisture content impregnated into the pores of vacuum processed biochars by varying the applied (negative) pressure during the treatment process. The graphs of four different biochars all show how the liquid content of the pours of each of them increase to 100% as vacuum reactor pressure is increased.

In another experiment, the percentage of water retained in the pores of pine derived biochar was measured to determine the difference in retained water in the pores of the biochar (i) soaked in water, and (ii) mixed with water subjected to a partial vacuum. For the soaking, 250 mL of raw biochar was mixed with 500 mL water in a beaker. Upon continuous stirring for 24 hrs., aliquots of the suspended solid were taken, drained on a paper towel and analyzed for moisture content. For the vacuum, 250 mL of raw biochar was mixed with 500 mL water in a vacuum flask. The flask was connected to a vacuum pump and negative pressure of 15" has been applied, aliquots of the treated solid were taken, drained on a paper towel and analyzed for moisture content.

The total retained water amounts were measured for each sample. For the soaked biochar, the moisture content of biochar remains virtually constant for the entire duration of the experiment, 52 wt. % (i.e. 1 g of "soaked biochar" contains 0.52 g water and 0.48 g "dry biochar"). Taking into account the density of raw biochar, 0.16 g/cm$^3$ (or mL), the volume of the 0.48 g "dry biochar" is 3.00 mL (i.e. 3 mL dry biochar can "soak" and retain 0.52 mL water, or 1 mL dry biochar can retain 0.17 mL water (sorbed on the surface and into the pores)).

For vacuum, the moisture content of the biochar remains virtually constant for the entire duration of the experiment, 72 wt. %, (i.e. 1 g of vacuum impregnated biochar contains 0.72 g water and 0.28 g "dry biochar"). Taking into account the density of raw biochar, 0.16 g/cm$^3$ (or mL), the volume of the 0.28 g "dry biochar" is 1.75 mL (i.e. 1.75 mL dry biochar under vacuum can "absorb" and retain 0.72 mL water, or 1 mL dry biochar can retain 0.41 mL water (sorbed on the surface and into the pores)).

It was next determined where the water was retained—in the pores or on the surface of the biochar. Capillary porosity ("CP") (vol % inside the pores of the biochar), non-capillary porosity ("NCP") (vol. % outside/between the particles), and the total porosity (CP+NCP)) were determined. Total porosity and non-capillary porosity were analytically determined for the dry biochar and then capillary porosity was calculated.

Since the dry biochar used in this experiment had a density less than water, the particles could be modeled and then tested to determine if soaking and/or treating the biochar could infuse enough water to make the density of the biochar greater than that of water. Thus, the dry biochar would float and, if enough water infused into the pores, the soaked or treated biochar would sink. Knowing the density of water and the density of the biochar, calculations were done to determine the percentage of pores that needed to be filled with water to make the biochar sink. In this specific experiment, these calculations determined that more than 24% of the pore volume would need to be filled with water for the biochar to sink. The two processed biochars, soaked and vacuum treated, were then immersed in water after 1 hour of said processing. The results of the experiment showed that the vast majority of the soaked biochar floated and remained floating after 3 weeks, while the vast majority of the vacuum treated biochar sank and remained at the bottom of the water column after 3 weeks.

Using the results of these experiments and model calculations, the biochar particles can be idealized to estimate how much more water is in the pores from the vacuum treatment versus soaking. Since the external surface of the materials are the same, it was assumed that the samples retain about the same amount of water on the surface. Then the most conservative assumption was made using the boundary condition for particles to be just neutral, i.e. water into pores equal 24%, the water distribution is estimated as follows:

| | DRY BIOCHAR | SOAKED BIOCHAR | VACUUM TREATED BIOCHAR |
|---|---|---|---|
| Experimental result | FLOATED | FLOATED | SANK |
| Total water (determined in first part of experiment) | 0% | 52% | 72% |
| Water in the pores (assumed for floating biochar to be boundary condition, calculated for biochar that sank) | 0% | 24% | 44% |
| Water on the surface (calculated for floating biochar, assumed to match floating biochar for the biochar that sank) | 0% | 28% | 28% |

In summary, these experimental tests and model calculations show that through vacuum treatment more than 24% of the pores of the biochar can be filled with water and in fact at least 1.8 times the amount of water can be infused into the pores compared to soaking. Vacuum treatment can impregnate almost two times the amount of water into the pores for 1 minute, while soaking does not change the water amount into the pores for three weeks.

The pores may be substantially filled or completely filled with additives to provide enhanced performance features to the biochar, such as increased plant growth, nutrient delivery, water retention, nutrient retention, disadvantageous species control, e.g., weeds, disease causing bacteria, insects, volunteer crops, etc. By infusing liquid into the pore structure through the application of positive or negative pressure, surfactant and/or ultrasonic waves, alone or in combination, provides the ability to impregnate the mesopores and macropores of the biochar with additives, that include, but are not limited to, soil enhancing solutions and solids.

The additive may be a soil enhancing agent that includes, but is not be limited to, any of the following: water, water solutions of salts, inorganic and organic liquids of different polarities, liquid organic compounds or combinations of organic compounds and solvents, mineral and organic oils, slurries and suspensions, supercritical liquids, fertilizers, PGPB (including plant growth promoting rhizobacteria, free-living and nodule-forming nitrogen fixing bacteria, organic decomposers, nitrifying bacteria, and phosphate solubilizing bacteria), biocontrol agents, bioremediation agents, saprotrophic fungi, ectomycorrhizae and endomycorrhizae, among others.

Fertilizers that may be infused into the biochar include, but are not limited to, the following sources of nitrogen, phosphorous, and potassium: urea, ammonium nitrate, calcium nitrate, sulfur, ammonium sulfate, monoammonium phosphate, ammonium polyphosphate, potassium sulfate, or potassium chloride.

Similar beneficial results are expected from other additives, such as: bio pesticides; herbicides; insecticides; nematicides; plant hormones; plant pheromones; organic or inorganic fungicides; algicides; antifouling agents; antimicrobials; attractants; biocides, disinfectants and sanitizers; miticides; microbial pesticides; molluscicides; bacteriacides; fumigants; ovicides; repellents; rodenticides, defoliants, desiccants; insect growth regulators; plant growth regulators; beneficial microbes; and, microbial nutrients or secondary signal activators, that may also be added to the biochar in a similar manner as a fertilizer. Additionally, beneficial macro- and micro-nutrients such as, calcium, magnesium, sulfur, boron, zinc, iron, manganese, molybdenum, copper and chloride may also be infused into the biochar in the form of a water solution or other solvent solution.

Examples of compounds, in addition to fertilizer, that may be infused into the pores of the biochar include, but are not limited to: phytohormones, such as, abscisic acid (ABA), auxins, cytokinins, gibberellins, brassinosteroies, salicylic acid, jasmonates, planet peptide hormones, polyamines, karrikins, strigolactones; 2,1,3-Benzothiadiazole (BTH), an inducer of systemic acquired resistance that confers broad spectrum disease resistance (including soil borne pathogens); signaling agents similar to BTH in mechanism or structure that protects against a broad range or specific plant pathogens; EPSPS inhibitors; synthetic auxins; photosystem I inhibitors photosystem II inhibitors; and HPPD inhibitors. Growth media, broths, or other nutrition to support the growth of microbes or microbial life may also be infused such as Lauryl Tryptose broth, glucose, sucrose, fructose, or other sugars or micronutrients known to be beneficial to microbes. Binders or binding solutions can also be infused into the pores to aid in the adhesion of coatings, as well as increasing the ability for the treated biochar to associate or bond with other nearby particles in seed coating applications. Infusion with these binders can also allow for the coating of the biochar particle itself with other beneficial organisms or substances.

In one example, a 1000 ppm $NO_3^-$ N fertilizer solution is infused into the pores of the biochar. As discussed above, the method to infuse biochar with the fertilizer solution may be accomplished generally by placing the biochar in a vacuum infiltration tank or other sealable rotating vessel, chamber or tank. When using vacuum infiltration, a vacuum may be applied to the biochar and then the solution may be introduced into the tank. Alternatively, the solution and biochar may both be introduced into the tank and, once introduced, a vacuum is applied. Based upon the determined total pore volume of the biochar or the incipient wetness, the amount of solution to introduce into the tank necessary to fill the pore of the biochar can be determined. When infused in this manner, significantly more nutrients can be held in a given quantity of biochar versus direct contact of the biochar with the nutrients alone.

When using a surfactant, the biochar and additive solution may be added to a tank along with 0.01-20% of surfactant, but more preferably 1-5% of surfactant by volume of fertilizer solution. The surfactant or detergent aids in the penetration of the wash solution into the pores of the biochar. The same or similar equipment used in the vacuum infiltration process can be used in the surfactant treatment process. Although it is not necessary to apply a vacuum in the surfactant treatment process, the vacuum infiltration tank or any other rotating vessel, chamber or tank can be used. Again, while it is not necessary to apply a vacuum, a vacuum may be applied or the pressure in the vessel may be changed. Further, the surfactant can be added with or without heat or cooling either of the infiltrate, the biochar, the vessel itself, or any combination of the three.

Figure 14:
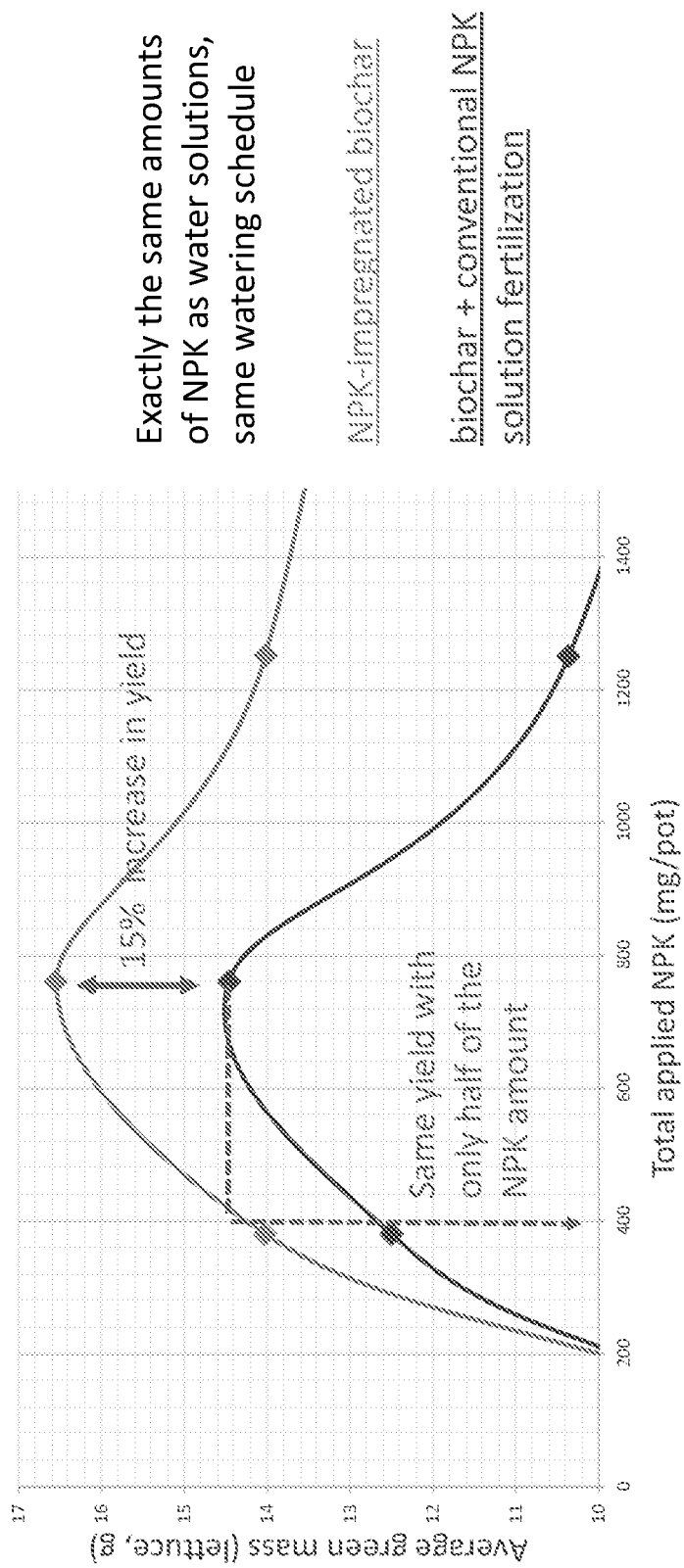
FIG. 14 illustrates the effects of NPK impregnation of biochar on lettuce yield.
Figure 15:
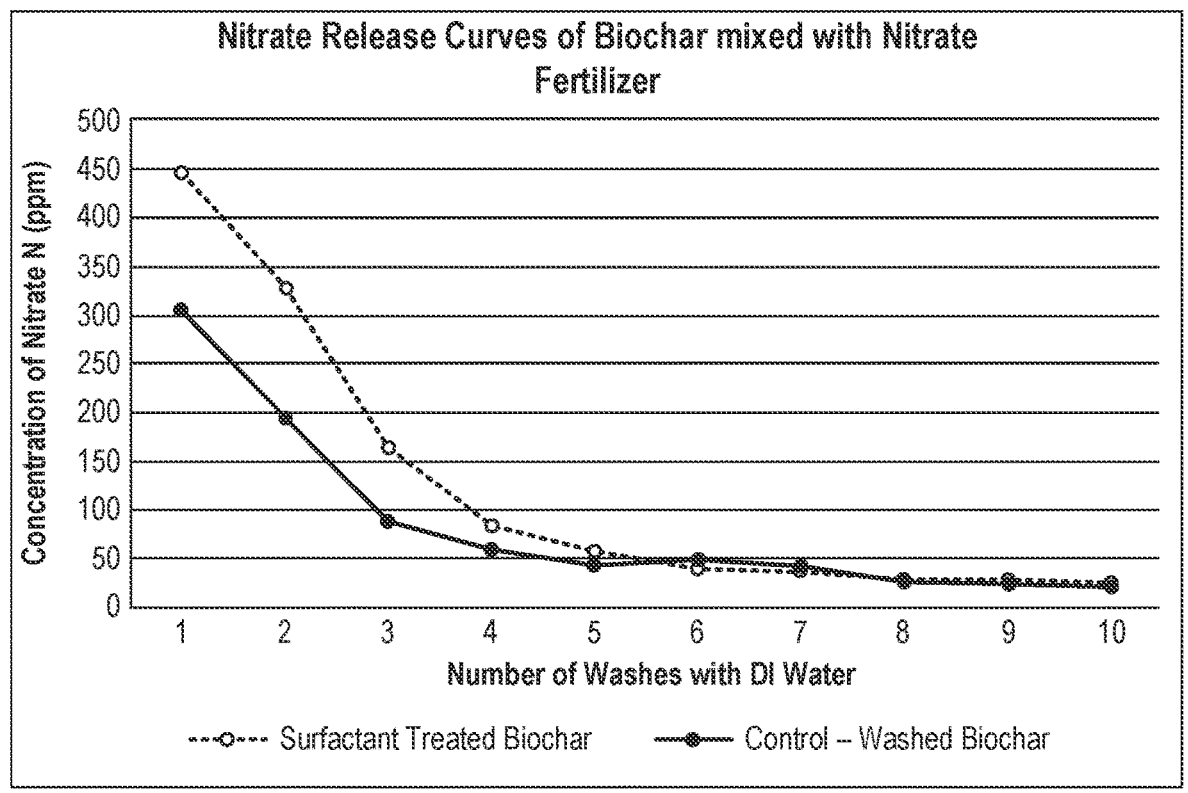
FIG. 15 is a chart showing nitrate release curves of treated biochars infused with nitrate fertilizer.

The utility of infusing the biochar with fertilizer is that the pores in biochar create a protective "medium" for carrying the nutrients to the soil that provides a more constant supply of available nutrients to the soil and plants and continues to act beneficially, potentially sorbing more nutrients or nutrients in solution even after introduction to the soil. By infusing the nutrients in the pores of the biochar, immediate oversaturation of the soil with the nutrients is prevented and a time released effect is provided. This effect is illustrated in connection with FIGS. 14 and 15. As demonstrated in connection with FIGS. 14 & 15 below, biochars having pores infused with additives, using the infusion methods described above, have been shown to increase nutrient retention, increase crop yields and provide a steadier flow of fertilizer to the root zones of the plants. In fact, the interior and exterior surfaces of the biochar may be treated to improve their sorption and exchange capabilities for the targeted nutrients prior to inoculation or infusion. This is the preferred approach as it allows for the tailoring of the surfaces to match the materials being carried. An example would be to treat the surfaces to increase the anionic exchange capacity when infusing with materials which typically manifest as anions, such as nitrates.

E. Turf Grass Application

Figure 16:
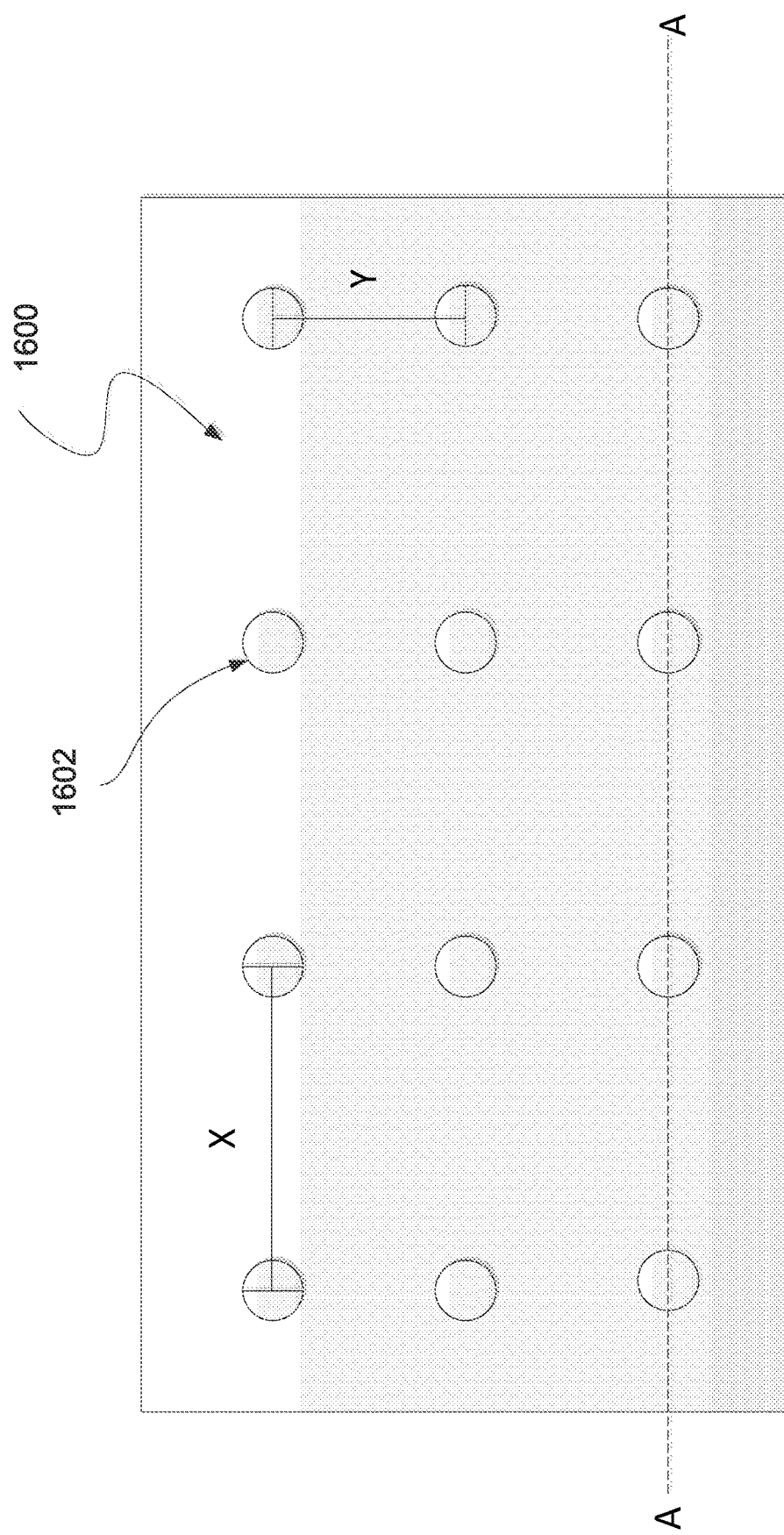
FIG. 16 illustrates a plan view of the creation of voids in soil for purposes of applying biochar.

Given all the added benefits of biochar, which may be enhanced through treatment processes as described above, applying biochar to existing turf, lawns, and grass can yield beneficial results. FIG. 16 illustrates one example of an application of biochar to an area of turf grass 1600. For turf applications, between one half and fifteen (0.5-15) cubic yards of treated biochar should be used for every acre, with two to six (2-6) cubic yards per acre being optimal. For established turf 1600, one method for applying the biochar is to aerate the turf 1600 to create voids 1602, prior to spreading, spreading the biochar using a broadcast method, and then raking the biochar to incorporate the biochar into the turf 1600 as well as the voids 1602. In application, voids 1602 could also be created in the turf area 1600, by, for example, extracting cores 1602, spaced apart by 6-12 inches, as represented by X and Y in FIG. 16. In existing turf installations, this method may be repeated over time until the percentage of biochar by volume in the soil at the plant root zone is equal to about 5 percent, to 50 percent, or more. Although not strictly necessary, this process of repeated application over time may take a number of years to accomplish, and further enhances the quality of the installation by allowing the biochar to more uniformly mix with the soil without the need to disrupt the turf installation.

Figure 17:
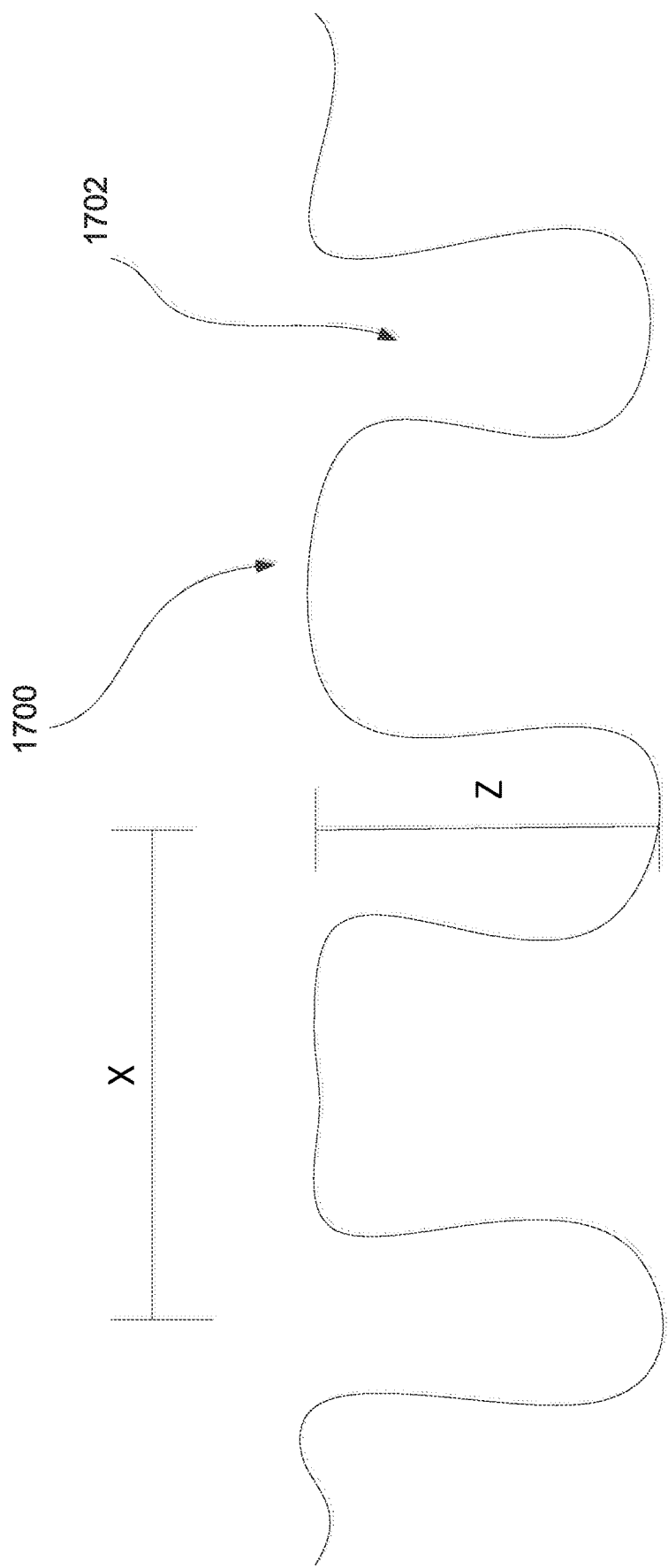
FIG. 17 is a cross-sectional view of one row of voids illustrated in FIG. 7, taken along line A-A of FIG. 16.

As illustrated in FIG. 17, which is a cross-sectional view of one row of voids illustrated in FIG. 16, taken along line A-A of FIG. 16, the voids are created at a depth of Z, which may correlate to the root zone. When applied to turf grass 1600, the voids are generally 2-12 inches deep. The biochar is then spread over the turf grass 1600 and then raked over the soil to incorporate the biochar into the soil and the voids. The biochar may be mixed with any number of other amendments (such as sand) to make distribution easier. Ideally, the biochar should be mixed in general proportion with the desired application rate, as a high volume of biochar (over 50%) in the aeration void spaces may demonstrate reduced effectiveness. As an alternative, a mechanism for simultaneous aeration and injection of a material into the soil beneath the existing turf may be used, such as the injection device outlined in U.S. Pat. No. 8,640,636. This device may be used with biochar, or with a mixture of biochar and other soil components, such as sand.

Figure 18:
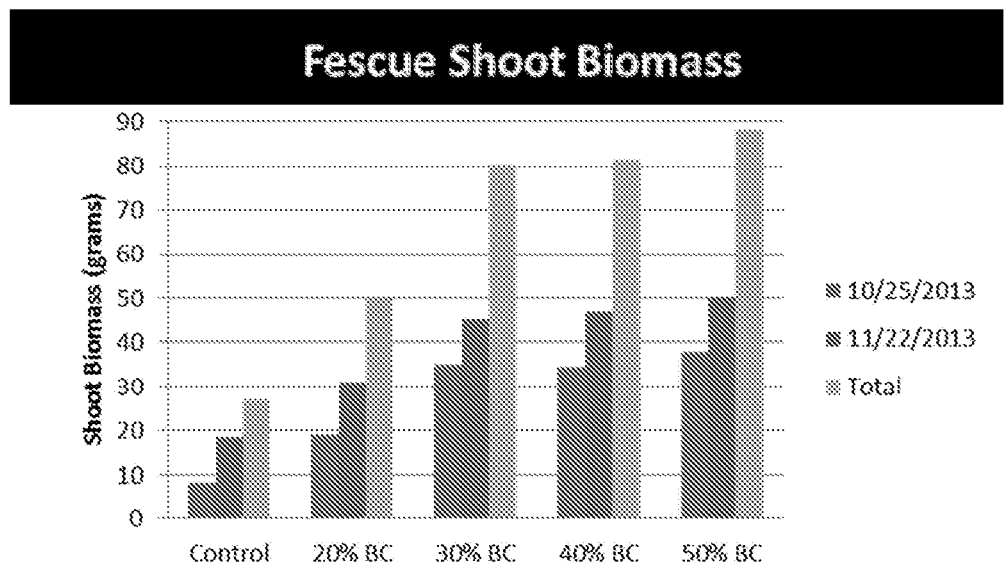
FIG. 18 is a chart illustrating increases in shoot biomass in Fescue grass grown in varying concentrations of treated biochar.
Figure 19:
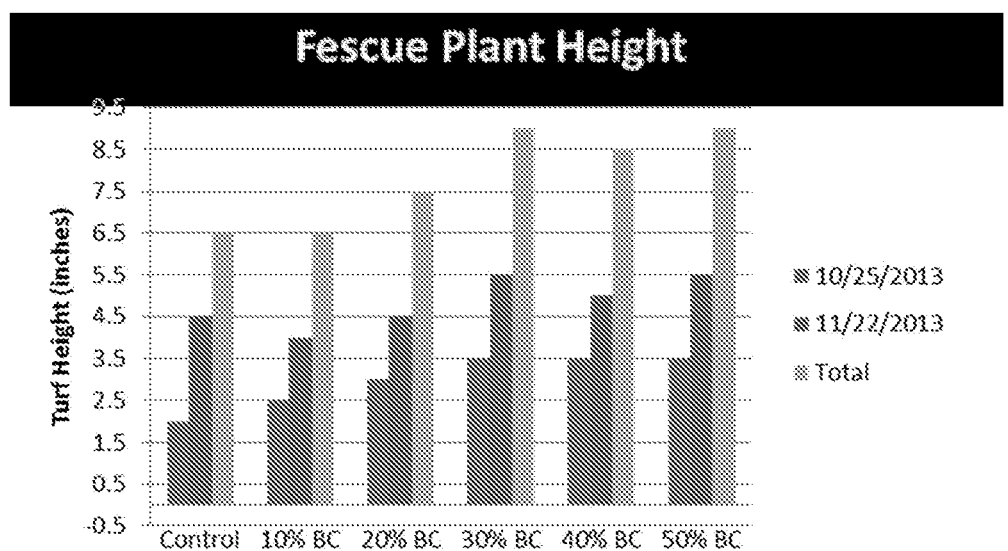
FIG. 19 is a chart illustrating plant height of the same Fescue grass illustrated in FIG. 18 showing the correlation between plant height and percentage of treated biochar in the soil.

Example benefits of the biochar to new turf grass from seed are illustrated in connection with FIGS. 18 and 19. FIG. 18 is a chart illustrating increases in shoot biomass in Fescue grass grown in varying concentrations of treated biochar. As biochar concentration increases, shoot biomass increases. Similarly, FIG. 19 is a chart illustrating plant height of the same Fescue grass illustrated in FIG. 18 showing the correlation between plant height and percentage of treated biochar in the soil. The charts demonstrate higher turf height growth in soils with increased concentrations. The control in both FIGS. 18 and 19 is soil absent any biochar. The same soil was used for the soils mixed with biochar at varying percentages.

Rather than applying to existing turf grass, biochar can also be applied to the dirt prior to installing new turf grass in sod form or establishing new turf grass from seed. For installations of new turf using sod, the biochar may be incorporated on the surface or into the top 0-4 inches of the soil prior to the placement of sod. In this case, for preparation of soil for turf, the average percentage of biochar in the root zone (a zone extending from the surface to a depth of up to six inches, but generally at depth of between three to four inches) should be between 0.01%-60% by volume, with 0.1%-30% by volume being optimal for most applications. When applied as a surface coating before sod application, the thin layer of biochar may contain up to 100% biochar, but be applied in a layer not to exceed one inch to the surface of the soil. These two methods may also be combined, with a percentage of biochar or treated biochar being incorporated into the soil to a depth of 0-4 inches in accordance with the rates above, and then followed by a thin (0.001 inches to 2 inches) surface coating of biochar or treated biochar prior to installation of the sod. For improved results when treating soil with biochar prior to laying the turf grass, the biochar/soil mixture can then be watered (e.g., to saturation or field capacity) and/or treated with macro or micro nutrients either in liquid or solid form, prior to or following the installation of the sod.

Alternatively, the biochar may be applied to the bottom (soil side) of the sod after it is cut, but before it is installed either at the site of installation or at the site of sod cutting/harvesting or at an intermediate site. One method of addition can be accomplished by contacting the damp root side of the sod with a flat area of biochar, then optionally applying pressure to allow the biochar to adhere to the root side of the sod. A chemical or organic binder may also be used to assist with the adhesion of biochar to the bottom of the sod. Both of these methods, along with others, can be used individually or simultaneously with the goal of establishing a layer of biochar underneath the sod installation to assist with water and nutrient retention which has proven to be beneficial for the development of juvenile roots and re-establishment of the sod in a new location.

Figure 20:
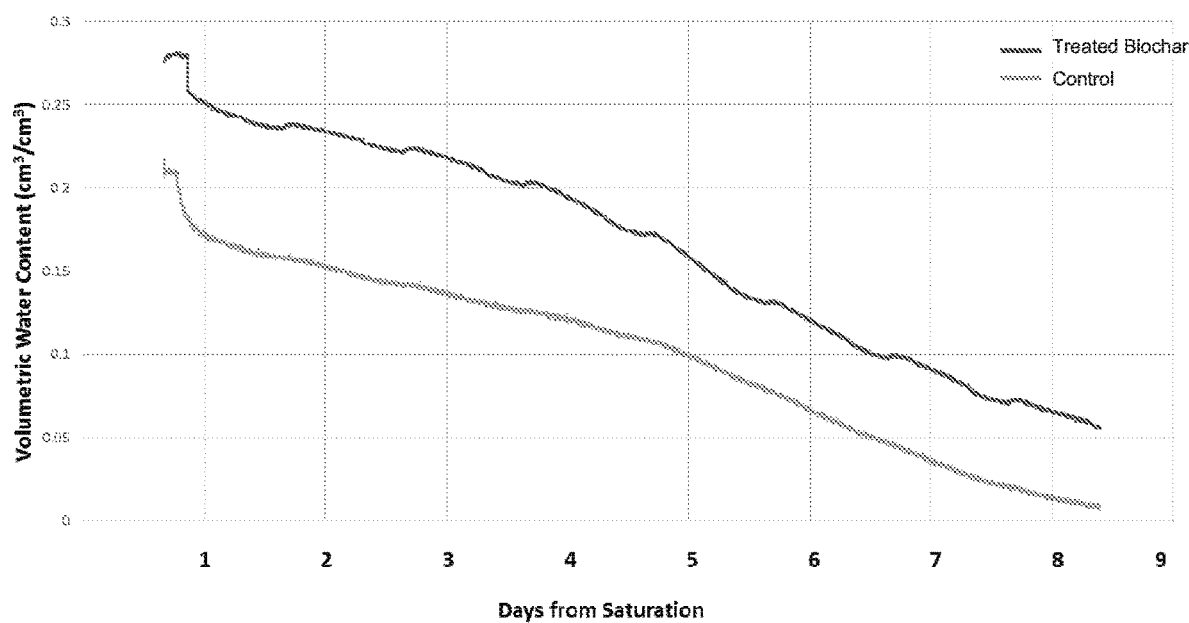
FIG. 20 depicts the increase in volumetric water content of sod when a layer of treated biochar is added to the surface of the soil before installation of the sod.

FIG. 20 depicts the increase in volumetric water content of sod when a layer of treated biochar is added to the surface of the soil before installation of the sod. Similar results would be expected when installing sod with biochar adhered to the root side of the sod. In this particular experiment, the control was a standard sod installation and it was compared with the installation of sod on top of a layer of treated biochar. Both samples were watered to saturation and then the water content was measured periodically over a period of more than 8 days. The results indicate that the sod installed onto the layer of treated biochar had a consistently higher water content (by volume) than the control.

As outlined in *Concepts in Photobiology: Photosynthesis and Photomorgphogenesis* (Edited by GS Singhal, G Renger, SK Sopory, K-D Irrgang and Govindjee, Narosa Publishers/New Delhi; and Kluwer Academic/Dordrecht, pp. 11-51), photosynthetic pigment molecules, mainly chlorophylls a and b, strongly absorb visible light in the 0.4-0.5 (blue) and in the 0.6-0.7 (red) micron range while strongly reflecting near infrared light. And thus, measuring a turfs' "greenness" by determining its Normalized Difference Vegetation Index (NDVI) provides a quantitative indirect measurement of the plants photosynthetic activity and thus its healthiness. One method for using this concept in turf trials is to use a drone with a visible and infrared camera to collect pictures and then analyze them to determine the near infrared and visible values. The NDVI is defined in the equation below, where VIS and NIR are the spectral reflectance measurements from the visible and near infrared ranges, respectively. The NDVI value will range from −1 to 1, where higher values indicate higher photosynthetic activity. Healthy turf generally has NDVI values that range from 0.2 to 0.4.

$$NDVI = \frac{(NIR - VIS)}{(NIR + VIS)}$$

Figure 21:
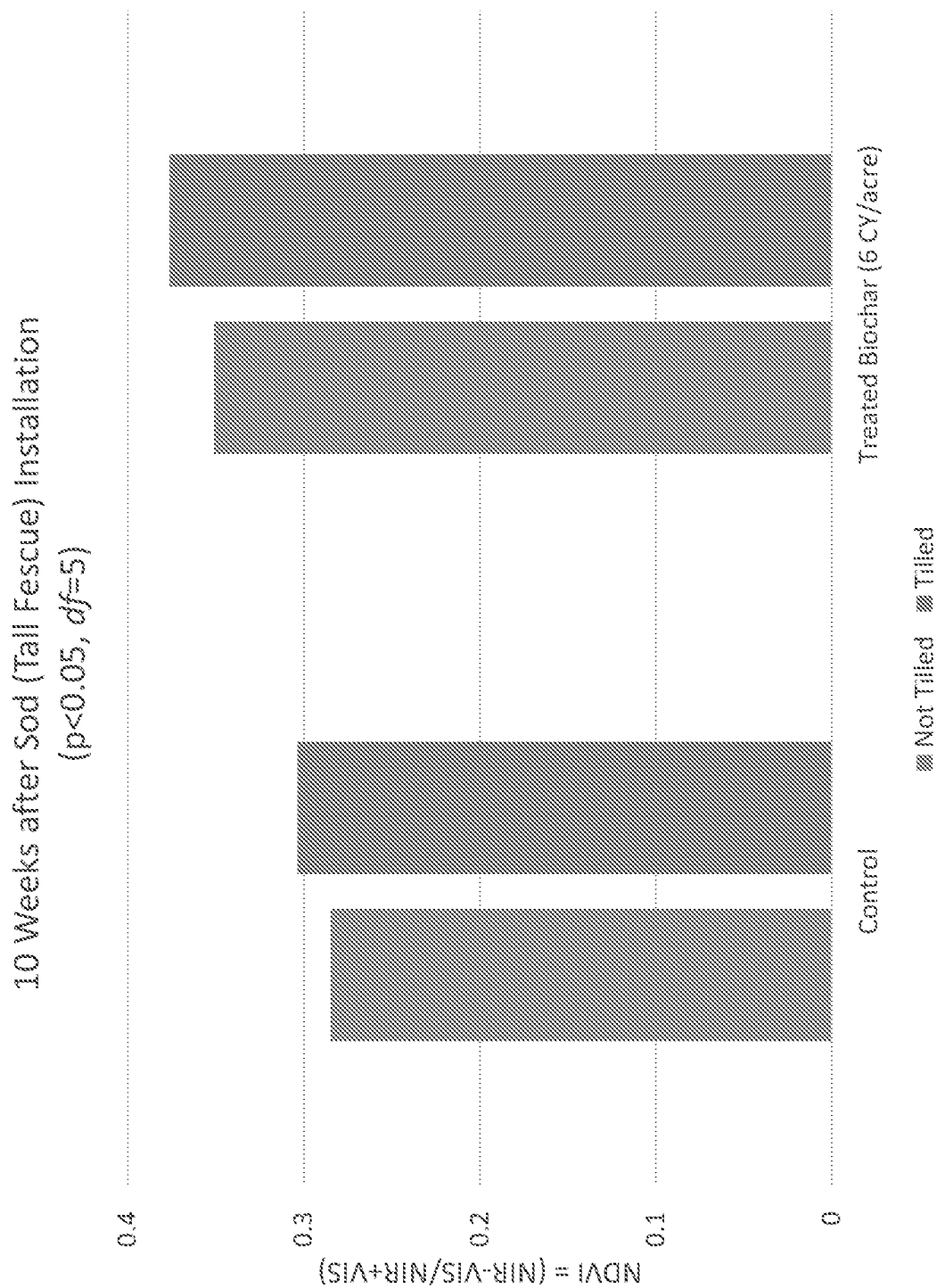
FIG. 21 is a chart showing how addition of enhanced biochar significantly improves turf health and greenness as measured by Normalized Difference Vegetation Index (NDVI)

As depicted in FIG. 21, one turf trial using Tall Fescue sod showed the use of a treated biochar applied prior to sod installation, whether tilled or not, improved the turf health and "greenness," as measured by NDVI 10 weeks after installation, by more than 20% over the control with no biochar addition.

Figure 22:
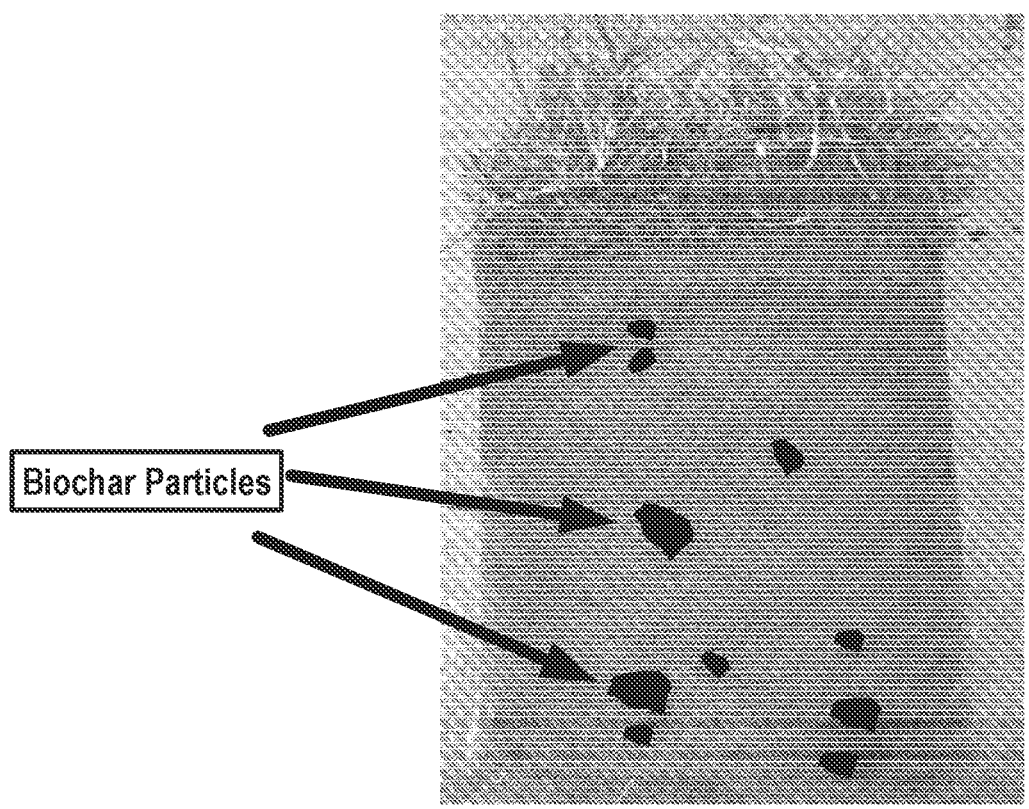
FIG. 22 illustrates that biochar particles applied to the surface of the soil prior to sod installation and not rototilled, migrate into the soil profile.

In the same trial, soil cores were taken from the treatment area where the treated biochar had been spread on top of the dirt prior to sod installation. FIG. 22 presents one of these cores taken nineteen (19) weeks after installation and clearly demonstrates that the treated biochar naturally migrated into the soil profile without any human intervention (e.g. rototilling). Treated biochar particles were seen greater than six (6) inches below the soil surface. This shows that rototilling may help distribute biochar into the soil but is not a necessary step in application.

Figure 23:
FIG. 23 illustrates that the addition of enhanced biochar significantly increases turf root development and biomass.

Also in this trial, representative root images were taken nineteen (19) weeks after installation and are shown in FIG. 23. Applying treated biochar before sod installation promoted greater root development and overall biomass. It is widely recognized that an extensive, well-branched, and deep root system allows plants to more efficiently extract water from the soil and tolerate drought and absorb nutrients more effectively. Thus, seeing increased root development with treated biochar usage, as demonstrated in FIG. 23, shows one possible reason turfs with treated biochar show a higher water concentration, as displayed in FIG. 20.

For growth of new turf from seed, the biochar may be incorporated uniformly into the top 2-4 inches of the soil by spreading and tilling. Other common methods used to incorporate soil amendments may also be used to incorporate the biochar uniformly into the top soil. In summary, the use of biochar during the installation of new turf from either seed or sod can dramatically reduce the need for high frequency saturation watering in the period immediately following installation.

In another example, the turf seeds themselves may be coated with biochar prior to planting. One method to coat the turf seeds with biochar may be accomplished generally by (i) creating a slurry of biochar and starch binder, (ii) immersing the seeds in the slurry, and (iii) then drying the seeds.

Figure 24:
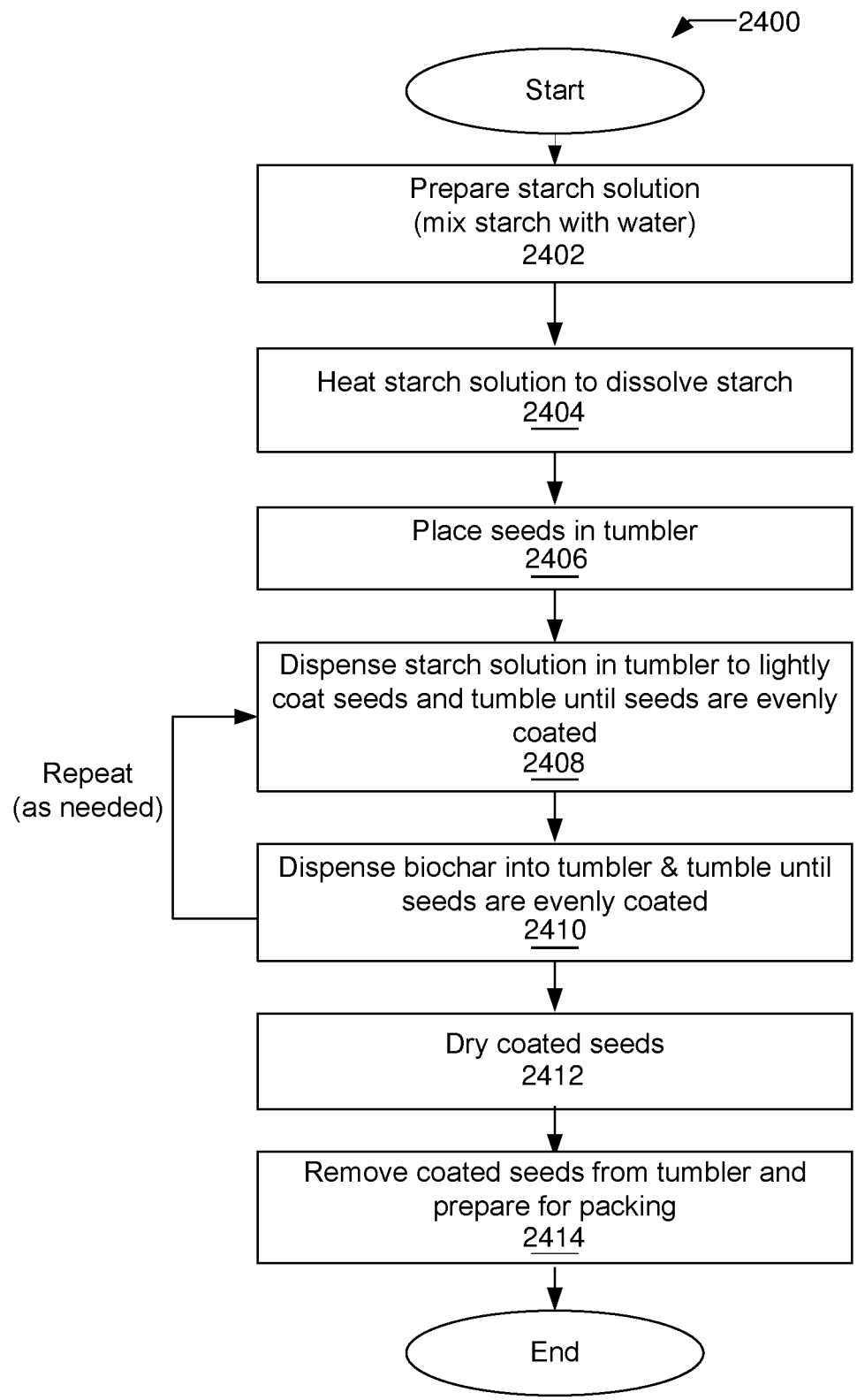
FIG. 24 is flow diagram of one example of a method for coating seeds with biochar.

FIG. 24 is a flow diagram 2400 of another example of a method that may be used for coating seeds with biochar. As illustrated in FIG. 24, the steps comprise: (i) preparing a starch solution (or binding solution) by mixing a starch (or a binder) with water to create a solution, step 2402; (ii) heating the starch solution to dissolve the starch, step 2404; (iii) placing seeds in a rotary tumbler, step 2406; (iv) dispensing the starch solution into the tumbler to coat seeds in a manner that lightly introduces the solution to the tumbler, step 2408; (v) tumbling the seeds until the seeds are evenly coated with the starch solution, step 2410; (vi) dispensing biochar in the tumbler to coat the seeds with biochar, step 2412; and (vi) drying the coated seeds while tumbling, step 2414.

At step 2402, the starch solution is prepared by mixing a starch or other binder with water. If the hydrophobicity of the biochar has been reduced during treatment, water alone can also be used as a binder. Corn starch is a simple example of a type of starch that may be used, although one skilled in the art will realize that there are many binders that can be used, such as starches, sugars, gum arabic, cellulose, clay, or polymers such as vinyl polymers, or a combination of these. The binder solution may be prepared by mixing enough corn starch with deionized $H_2O$ to create a solution. For example, the starch may be approximately 2% by weight, but may range from 0.5% to 10% of starch by weight.

Those skilled in the art will recognize that another starch, besides corn starch may be used as a binder. Additionally, other binders may be used with the restriction that they may not be phytotoxic and must be suitable for introduction into soil or other environments where seeds are germinated and the resulting seedlings are matured. Some examples of these other binders are gelatins, cellulose, sugars, or combinations thereof. The binding solution can be made from a starch or other type of binder. According, the starch solution and starch, in the illustrated example, are only one type of binding solution or binder that may be used in connection with the present invention.

In this particular embodiment, at step 2404, the starch solution is then heated to dissolve the starch. At step 2406, the seeds are then placed in a tumbler, such as a rotary tumbler. The seeds may be weighed prior to placement in the tumbler. A variable speed tumbler may be used to help facilitate the mixing.

At step 2406, the seeds are placed in a rotary tumbler and the tumbler is prepared for introduction of the starch (or other binder) solution. The seeds are then lightly sprayed with starch solution and tumbled with the starch solution until they are evenly coated with the starch/binder solution.

Thereafter, at step 2410, the biochar may be added to the tumbler. Prior to adding to the tumbler, the biochar may be prepared by reducing it to a power if the particle size is not already desirable, by either shifting or reducing the particle size of the biochar to one that is suitable for seed coating. If needed, the biochar may be pulverized to an average particle size of <1 mm. The size of the biochar particles may be adapted to the size of the seeds being coated, with larger seeds optionally utilizing larger particle sizes. As mentioned previously, the method of sizing the biochar may be grinding, pulverizing, crushing, fracturing using ultrasonic, chemical, thermal, or pressure mechanisms, sieving, hydrodynamically sorting, attritting, or any combination of these.

Prior to adding the biochar, if necessary, the powered biochar may be dried at a temperature of at or about 120 degrees C. Additionally, beneficial macro- and micro-nutrients such as nitrogen, phosphorous, potassium, calcium, magnesium, sulfur, boron, zinc, iron, manganese, molybdenum, copper and chloride or starter fertilizers using ammonium nitrate, ammonium sulfate, monoammonium phosphate, or ammonium polyphosphate with added micronutrients can be added to the mixture at this time. Optionally, the biochar may have been already infused with these nutrients, beneficial microbes, or even the binder solution itself during the treatment process outlined earlier. In some applications, the biochar may have already been infused with a substance that will react with the binder added in this step to provide a more functional two stage biodegradable adhesive such as those outlined in U.S. Pat. No. 8,895,052 or others which perform in similar manner. These types of adhesives function in a similar manner to common epoxies, but demonstrate biodegradable characteristics that may make them more suitable for agricultural applications.

The mixture may also be heated or cooled during this stage to enhance or improve either the performance of the binder or maintain the inoculant (if used) at a proper temperature to assure efficacy. When adding to the tumbler, the powered biochar is sprinkled or otherwise dispensed into the tumbler until the seeds are coated, step 2412.

If a thicker coating of biochar is desired, then steps 2408 and 2410 may be repeated. Each of the layers of biochar may optionally be infused with the same, different, or zero nutrients, microbes, or other beneficial substances, causing the layers the be the same or causing them to be different or varied. The seeds may be sprayed with starch solution again and allowed to tumble until evenly coated. If nutrients are added, they may also be layered during this process such that nutrients most beneficial to early germination and seedling growth are incorporated onto the biochar coated seeds. Then, more biochar mixture may be added to the tumbler to increase the coating thickness until the desired coating thickness is achieved. For example, these steps may be repeated, as necessary, to assure consistent coating to an average thickness of 0.01 to 100 times the diameter of the seed.

Figure 25:
FIG. 25 is an image of coated seeds of the present invention.
Figure 26:
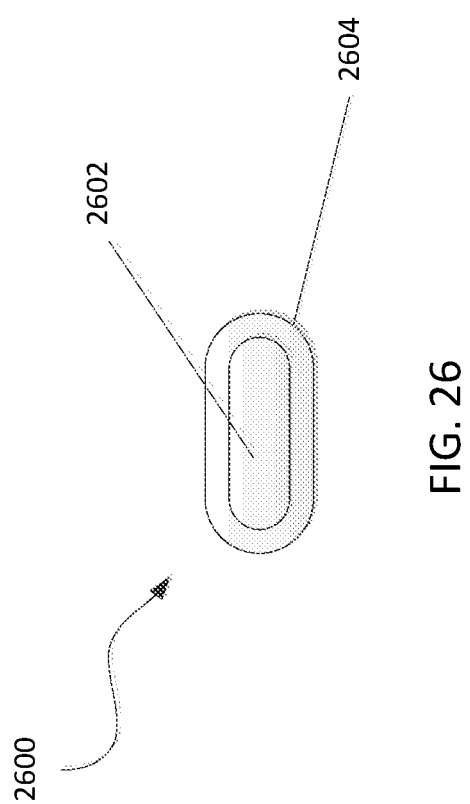
FIG. 26 illustrates one example of a cross-section of a coated particle of the present invention.

Once the desired coating thickness is achieved, the coated seeds may then be dried, for example, by tumbling at ambient temperature for a period of 12 hours, step 2412. Once dried, the coated seeds may then be removed from the tumbler and prepared for packing. An example of the end product is illustrated in the image attached as FIG. 25.

Optionally, a fertilizer, nutrient or microbial carrier (other than biochar) may be added to coat the seeds in any of the layers. If a fertilizer is desired, the fertilizer may be pulverized to prepare for addition. The pulverized fertilizer may be added with the biochar or may be added separately, using a different coating step from that of the biochar. Like the biochar, the fertilizer, when added, is dispensed to allow for even coating of the seeds and is tumbled with seed for adequate time to disperse evenly across the seeds. The fertilizer may also be pulverized to an average particle size of <1 mm before dispensing. Examples of fertilizers that may be added to the coat, include, but are not limited to the following: ammonium nitrate, ammonium sulfate, monoammonium phosphate, ammonium polyphosphate, Cal-Mag fertilizers or micronutrient fertilizers. Other additives, such as fungicides, insecticides, nematicides, plant hormones, beneficial microbial spores, or secondary signal activators, may also be added to the coating in a similar manner as a fertilizer, the inclusion of which does not depart from the scope of the invention.

The above is only one example of how seeds may be coated with biochar prior to use as a soil amendment. Those skilled in the art will recognize that there are many other mechanisms and processes that may be used to coat seeds without departing from the scope of the invention. Those skilled in the art will further recognize that the present invention can be used on any type of plant seed, including, but not limited to, the following: grass, corn, wheat, soybeans, sugar beet, ornamental plant, vegetable, such as tomato, cucumber, squash, or lettuce, or any other plant commonly grown from seeds. For purposes of this application, grass seeds shall include all types of grass seeds.

When the coated seeds are grass seeds, the coated seeds may then be applied using normal seeding techniques at the rate of between 500-1000 lbs. per acre for lawns or ornamental applications, ranges of between 15 and 4000 lbs. per acre may also be used without departing from the scope of the invention. For pasture grass applications, the application rate is typically lower, generally between 15-100 lbs. per acre.

The utility of coating the seeds with the biochar is that the biochar creates a protective "oasis" of water and nutrient retention around the seed to provide a more constant supply of available water and nutrients to the seedling during germination and initial growth. Coating seeds also allows for much easier application of biochar to the turf environment. It should be noted that coated seeds can also be used in "overseeding" applications for existing turf—namely applications where seeds are added to either increase the density of existing turf, or to establish an annual turf (e.g. rye) during a season where the perennial turf is dormant. Additionally, the seeds may be coated with treated biochar pre-infused with either nutrients, or microbial agents, such as mycorrhizal fungi, biocontrol bacteria or fungus, plant growth promoting rhizobacteria, mineral solubilizing microorganisms, or other microbes which demonstrate efficacy in turf grass environments.

The biochar increases the water and nutrient holding capacity of the immediate surroundings of the seed. Biochar applied in the manner described above results in more vigorous root development and increased establishment time leading to healthier plants with increased disease resistance compared to plants from seeds absent the biochar coating. Coating seeds in this manner can also be a greatly improved mechanism for delivery of both biochar as well as any nutrient or microbe infused into the biochar into the soil as the delivery can be accomplished simultaneously with the delivery of the seed into the soil.

Furthermore, the present invention may be used to coat other particles, besides seeds, with biochar. A solid or semi-solid particle, such as a small stone, polymer bead, biodegradable plastic pellet, fragment of a mineral such as perlite, or other particle that displays generally uniform distribution in particle size when seen in aggregation may be coated in the same manner as the seeds (described above) to assist with the distribution of biochar, or treated biochar, in a more efficient manner. This method may be used to produce biochar pellets in a manner that does not rely on heat or pressure treatment. Thus, coating particles, as set forth above, can avoid many issues associated with maintaining efficacy of microbes or less stable nutrients or microbial energy sources when making pellets from biochar or treated biochar without a core particle.

Additionally, the particle coated may also be an ingestible particle, such as animal feed pellets, medicines, vitamins or other nutrients or feed particles. Coating such ingestible particles with biochar or treated biochar may assist in the addition of biochar or treated biochar into the animal food chain and assist in the use of the biochar or treated biochar in animal health applications. By way of example only, particles for use in the present invention may be any type of particles that can be safely ingested or safely used in connection with agricultural application. Optimally, such particles will range in size from 50 to 0.001 millimeters in diameter.

FIG. 26 illustrates one example of a cross-section of a coated particle 1800 of the present invention. As illustrated in FIG. 26, the particle 2602, which may be seed other particle suitable for the delivery of biochar for an intended purposes, may be substantially coated with a layer of biochar 2604. While FIG. 26 only illustrates one layer of coating, as described above, it is within the scope of the invention to coat the particle with one or more layers of biochar, which layers may further include water, other nutrients or other additives as set forth above. The water, nutrients and/or additives may be mixed with the biochar, added separately from the biochar, or infused into the biochar through the various treatment methods, as described previously.

Coated seeds could be applied to the soil, distributed by quantity, in the same amounts as recommended for the seed types that are coated. As the coated seeds will be heavier, distribution by weight will be higher than recommended per acre than uncoated seeds, and may, for example, range from applying coated seeds to soil at a rate of between 15 to 4000 pounds per acre.

In additional to turf applications, similar benefits to new or existing turf treated with biochar or treated biochar will be seen for biochar treatment in landscape applications of ornamental shrubs, trees, or similar plants. The container or planting holes should be filled with a blend of biochar and soil to achieve an approximate 1 to 30% percent mix by volume (optimally 3 to 20%) of biochar in the soil. If amending a large area in which fairly small plants will be installed, application can be done in just the top 2 to 4 inches of soil, as the biochar particles will migrate into the soil profile as the plants grow. Also, for plants less than a gallon, using a 12 cup of biochar or treated biochar per plant is a good rule of thumb. Additionally, similar to the method of applying biochar or treated biochar to the bottom of sod, the rootball of container plants, shrubs, or trees may be either coated with biochar, or dipped in a solution consisting of any combination of biochar, treated biochar, water, soluble nutrients, microbes, compost teas, binders (starches, sugars, polymers, gum arabic, clay, cellulose, and other common binders) such as those outlined in the description of coating sod. This dipping can occur either at the nursery, or immediately before planting as the plants are removed from their containers, flats, or other carrier prior to placement into the soil.

For existing trees, application can be done in multiple ways. The easiest of which is top dressing by applying a layer of biochar or treated biochar about one (1) inch thick under the tree canopy and then covering with compost or mulch. For medium and large trees, this can equate to about 5-10 gal of biochar per tree. Another method would be side dressing by digging around the root zone and mixing the biochar into the backfill targeting a concentration of about 5 to 25% by volume. Another more invasive option which can incorporate the material into the roots is to extract the soil around the roots and then fill in with a mixture of biochar and soil with a concentration of biochar between 1 to 30% by volume. One method to remove the soil from around the roots is using air spading. These application methods for existing trees can also be applied to other existing landscape plants.

For the installation or transplanting of trees, shrubs, ornamental plants, or flowers into a new environment, a hole may be first dug to create a void space for the installation of the new plant. This hole is generally equal to or larger than the size of the root ball of the plant. The soil removed while creating this void is typically referred to as "backfill." The plant to be installed is placed into this void. In many cases, the plant must be removed from its container or packing material to be installed in this way, although this is not strictly necessary. After the placement of the plant, the backfill is returned to the hole. At any time, prior to the replacement of backfill into the void, biochar or treated biochar should be mixed with the backfill at 0.01% to 50% by volume, preferably from 3% to 20% by volume.

One skilled in the art will note that other materials, such as nutrients, microbes, rooting hormones, compost, or other beneficial substances or soil amendments may be mixed with the backfill prior to replacement in the void space. Additionally, as an optional step, the root ball of the plant to be installed (where the root ball is understood to be the mass of root tissue and soil which is retained after the plant is removed from its container) may be coated with a mixture of biochar and water, or biochar and a binder before being placed into the void space. Water, nutrients or other additives may be added to either the void space or the backfill at any time during this process. In another example of an installation, a slurry of biochar and water, and optionally other additives (water, nutrients or other beneficial substances) may be added to the void space and the plant placed in this slurry.

In applications where many plants are to be installed into a large area of soil, the soil may be prepared en masse by incorporating the biochar or treated biochar into the soil at a rate of between 0.01% to 50% by volume, preferably from 0.1% to 5% by volume to a depth of between 0.1 inches and 24 inches, preferably from 0.1 inches to 4 inches. This incorporation may be accomplished using one of many commonly used methods for incorporation, such as tilling, turning, mixing, drop spreading, agitating, aerating, or injecting. The biochar may also be surface applied either by itself, or by mixing it with mulch or other materials commonly applied to the surface of landscape installations. In one example of an installation, the biochar is applied to the surface of the soil in a 0.25 inch layer, and then mulch is applied on top of the layer of biochar or treated biochar. The biochar may be applied on the surface either before or after the plants are installed, and may be applied alone or mixed with other additives, soil components, or amendments. The thickness of the layer of application can be from a single particle of biochar to 2 inches, but preferably from 0.1 inches to 0.5 inches. In surface applications, it may be desirable to use biochar that has been treated to increase its hydrophilicity and also to increase its bulk density to be greater than that of water in order to keep the biochar from floating away or running off during rainfall or irrigation events.

In some applications, the root ball of ornamental trees, shrubs, or plants is covered with a biodegradable or partially biodegradable material, such as burlap. In these applications, the burlap or wrapping material may itself be immersed in a solution of biochar and liquid, or the wrapping material may be saturated with moisture, adhesive, a binder, or a combination of any of these, and then contacted with biochar or treated biochar with the goal of using the wrapping material as a substrate or support to carry the biochar into the soil along with the plant. In this case, the coated layer can consist of either biochar by itself, or a mixture of biochar with other soil components, amendments, nutrients, biological entities, carriers, or substances beneficial to plant or soil health. The biochar or biochar mixture may also be added to the inside of the wrapping with or without water or other saturation before the wrapping is applied to the root ball. Although the biochar may be applied at any thickness and concentration, a thickness of 0.1 inch to 1 inch is preferred.

Biochar increases the water and nutrient holding and retention capacity of the soils where it is applied and provides an environment for improved microbial growth. Treatment of biochar can enhance all of these capabilities: increasing water holding capacity by increasing available pore volume through the elimination of residual material from the pyrolysis process from the pore space, increasing nutrient holding by improving ionic exchange characteristics such as CEC and AEC, and improving microbial growth by providing necessary shelter, water, macronutrients, and/or micronutrients to microbes. These components are held in the root zone for easy access by plant roots, which lead to increased plant and soil health, usually manifested by more robust growth. Biochar applied in the manner described above results in greener, fuller turf and landscape compared to installations grown without it and increases the plants ability to survive and thrive in conditions where it is deprived of water or nutrients. Tree plantings and transplants planted with biochar applied in the manner described above demonstrate substantial decreases in the rate of mortality and the ability to sustain plant health during variations in seasonal rainfall.

As outlined above, for all of the methods presented for biochar applications other materials and additives can be applied in conjunction with the biochar. These materials can be added to the biochar or can be infused in pores of the biochar using the methods first set forth above. Such additives may include, but not be limited to fertilizers (e.g., ammonium nitrate, ammonium sulfate, monoammonium phosphate, ammonium polyphosphate, Cal-Mag fertilizers or micronutrient fertilizers). Other additives, such as fungicides, insecticides, nematicides, plant hormones, beneficial microbial spores, compost, soil amendments, agricultural minerals, binders, microbial nutrients, soil components, secondary signal activators, mycorrhizal fungi, biocontrol bacteria or fungus, plant growth promoting rhizobacteria, mineral solubilizing microorganisms (or other microbes which demonstrate efficacy in turf grass and landscaping environments) and/or other material generally understood to be beneficial to plant growth (including but not limited to water), may also be added to the coating in a similar manner as a fertilizer, the inclusion of which does not depart from the scope of the invention. Such additives may be mixed with the biochar, added separately from the biochar, or infused into pores of biochar through the various treatment methods, as described previously.

The invention has been proven effective by application in several cities in California to turf and landscape areas. With just a single application, the treated biochar enabled one city to cut watering in half while improving the overall turf quality in front of city hall. While a single application results in improved quality and water savings, a second application may provide further benefit. It is believed that additional applications will create cumulative benefits to overall soil performance and plant health.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

We claim:

1. A method of applying a biochar to a sod, the method comprising:
    contacting a root side of the sod with the biochar, thereby adhering the biochar to the root side of the sod; wherein the biochar consists essentially of pyrolyzed, torrefied, or gasified biomass or wherein the biochar does not comprise pyrolyzed, torrefied, or gasified fossil fuel; and wherein the biochar comprises at least 55 wt % carbon.

2. The method of claim 1, wherein the adhering further comprises applying pressure to the sod and the biochar.

3. The method of claim 1, wherein the adhering further comprises adding, to the biochar or to the root side of the sod, a substance that improves the adhesion of the biochar to the root side of the sod; wherein the adding occurs before the contacting the root side of the sod with the biochar.

4. A turf sod composition comprising a sod and a biochar, wherein the sod comprises a root side, and wherein the biochar is attached to the root side of the sod; wherein the biochar consists essentially of pyrolyzed, torrefied, or gasified biomass or wherein the biochar does not comprise pyrolyzed, torrefied, or gasified fossil fuel; and wherein the biochar comprises at least 55 wt % carbon.

5. A plant root ball composition comprising a root ball, soil, and a biochar, wherein the biochar is attached to surface of the root ball; wherein the biochar consists essentially of pyrolyzed, torrefied, or gasified biomass or wherein the biochar does not comprise pyrolyzed, torrefied, or gasified fossil fuel; and wherein the biochar comprises at least 55 wt % carbon.

6. A plant root ball composition comprising a root tissue, a soil, a wrap, and a biochar; wherein the wrap surrounds the root tissue and the soil; and wherein the biochar is attached to a surface of the wrap or is positioned between the wrap and the root tissue; wherein the biochar consists essentially of pyrolyzed, torrefied, or gasified biomass or wherein the biochar does not comprise pyrolyzed, torrefied, or gasified fossil fuel; and wherein the biochar comprises at least 55 wt % carbon.

* * * * *